(12) United States Patent
Harvey et al.

(10) Patent No.: US 6,784,901 B1
(45) Date of Patent: Aug. 31, 2004

(54) METHOD, SYSTEM AND COMPUTER PROGRAM PRODUCT FOR THE DELIVERY OF A CHAT MESSAGE IN A 3D MULTI-USER ENVIRONMENT

(75) Inventors: William D. Harvey, Palo Alto, CA (US); Jason G. McHugh, East Palo Alto, CA (US); Fernando J. Paiz, Millbrae, CA (US); Jeffrey J. Ventrella, San Francisco, CA (US)

(73) Assignee: There, Menlo Park, CA (US)

( * ) Notice: Subject to any disclaimer, the term of this patent is extended or adjusted under 35 U.S.C. 154(b) by 734 days.

(21) Appl. No.: 09/653,352

(22) Filed: Aug. 31, 2000

Related U.S. Application Data

(60) Provisional application No. 60/202,920, filed on May 9, 2000.

(51) Int. Cl.[7] .............................. G09G 5/00; G06F 15/16
(52) U.S. Cl. ........................ 345/757; 758/848; 709/204; 709/227
(58) Field of Search ................................ 345/758, 706, 345/733, 757, 753, 850, 848, 689, 852; 463/32; 709/227, 204

(56) References Cited

U.S. PATENT DOCUMENTS

| | | | |
|---|---|---|---|
| 5,021,976 A | 6/1991 | Wexelblat et al. | .......... 364/521 |
| 5,423,554 A | 6/1995 | Davis | .......................... 273/437 |
| 5,515,078 A | 5/1996 | Greschler et al. | ........... 345/156 |
| 5,559,995 A | 9/1996 | Browning et al. | .......... 395/500 |
| 5,587,936 A | 12/1996 | Levitt et al. | ................. 364/578 |
| 5,588,104 A | 12/1996 | Lanier et al. | ................ 395/326 |
| 5,588,139 A | 12/1996 | Lanier et al. | ................ 395/500 |
| 5,633,993 A | 5/1997 | Redmann et al. | ........... 395/119 |
| 5,644,993 A | 7/1997 | Dohnalik | ..................... 108/108 |
| 5,679,075 A | 10/1997 | Forrest et al. | ................. 463/9 |
| 5,684,943 A | 11/1997 | Abraham et al. | ........... 395/173 |
| 5,696,892 A | 12/1997 | Redmann et al. | ........... 395/125 |
| 5,704,837 A | 1/1998 | Iwasaki et al. | ............... 463/38 |
| 5,732,232 A | 3/1998 | Brush, II et al. | ........... 395/339 |
| 5,736,982 A | 4/1998 | Suzuki et al. | ................ 345/330 |
| 5,755,620 A | 5/1998 | Yamamoto et al. | ........... 463/34 |
| 5,784,570 A | 7/1998 | Funkhouser | ........... 395/200.77 |
| 5,793,382 A | 8/1998 | Yerazunis et al. | .......... 345/474 |

(List continued on next page.)

OTHER PUBLICATIONS

James Jung–Hoon Seo, "Active Worlds", Mar. 13, 2000, <http://acg.media.mit.edu/people/jseo/courses/mas963/assign5–activeworlds.html> (visited Mar. 11, 2003).

(List continued on next page.)

*Primary Examiner*—Krisna Lim
(74) *Attorney, Agent, or Firm*—Sterne Kessler Goldstein & Fox P.L.L.C.

(57) ABSTRACT

A chat system, method and computer program product for delivering a message between a sender and a recipient in a three-dimensional (3D) multi-user environment, wherein the 3D multi-user environment maintains respective digital representations of the sender and the recipient, uses a recipient interface to receive a message, map the message to a texture to generate a textured message, and render the textured message in the 3D multi-user environment so as to permit the recipient to visually ascertain the location of the digital representation of the sender in the 3D world. Received messages are mantained as two-dimensional elements on a recipient viewport.

87 Claims, 22 Drawing Sheets

U.S. PATENT DOCUMENTS

| | | | |
|---|---|---|---|
| 5,815,156 A | 9/1998 | Takeuchi | 345/419 |
| 5,827,120 A | 10/1998 | Kikuchi et al. | 463/40 |
| 5,846,134 A | 12/1998 | Latypov | 463/46 |
| 5,852,672 A | 12/1998 | Lu | 382/154 |
| 5,874,956 A | 2/1999 | LaHood | 345/339 |
| 5,880,731 A | 3/1999 | Liles et al. | 345/349 |
| 5,884,029 A | 3/1999 | Brush, II et al. | 395/200.32 |
| 5,903,395 A | 5/1999 | Rallison et al. | 359/630 |
| 5,903,396 A | 5/1999 | Rallison | 359/630 |
| 5,907,328 A | 5/1999 | Brush II et al. | 345/358 |
| 5,913,727 A | 6/1999 | Ahdoot | 463/39 |
| 5,919,045 A | 7/1999 | Tagge et al. | 434/62 |
| 5,926,179 A | 7/1999 | Matsuda et al. | 345/355 |
| 5,926,400 A | 7/1999 | Kytle et al. | 364/578 |
| 5,947,823 A | 9/1999 | Nimura | 463/32 |
| 5,951,015 A | 9/1999 | Smith et al. | 273/358 |
| 5,956,038 A | 9/1999 | Rekimoto | 345/419 |
| 5,966,129 A | 10/1999 | Matsukuma et al. | 345/418 |
| 5,966,130 A | 10/1999 | Benman, Jr. | 345/418 |
| 5,980,256 A | 11/1999 | Carmein | 434/55 |
| 5,982,372 A | 11/1999 | Brush, II et al. | 345/418 |
| 5,982,390 A | 11/1999 | Stoneking et al. | 345/474 |
| 5,983,003 A | 11/1999 | Lection et al. | 395/200.32 |
| 5,999,641 A | 12/1999 | Miller et al. | 382/154 |
| 5,999,944 A | 12/1999 | Lipkin | 707/104 |
| 6,001,065 A | 12/1999 | DeVito | 600/544 |
| 6,009,458 A | 12/1999 | Hawkins et al. | 709/203 |
| 6,009,460 A | 12/1999 | Ohno et al. | 709/204 |
| 6,011,558 A | 1/2000 | Hsieh et al. | 345/435 |
| 6,014,136 A | 1/2000 | Ogasawara et al. | |
| 6,014,142 A | 1/2000 | LaHood | 345/355 |
| 6,020,885 A | 2/2000 | Honda | 345/332 |
| 6,020,891 A | 2/2000 | Rekimoto | 345/419 |
| 6,023,270 A | 2/2000 | Brush, II et al. | 345/333 |
| 6,024,643 A | 2/2000 | Begis | 463/42 |
| 6,028,584 A | 2/2000 | Chiang et al. | 345/118 |
| 6,031,549 A | 2/2000 | Hayes-Roth | 345/474 |
| 6,034,692 A | 3/2000 | Gallery et al. | 345/427 |
| 6,040,841 A | 3/2000 | Cohen et al. | 345/473 |
| 6,040,842 A | 3/2000 | Wavish et al. | 345/473 |
| 6,052,114 A | 4/2000 | Morifuji | 345/158 |
| 6,054,991 A | 4/2000 | Crane et al. | 345/420 |
| 6,055,563 A | 4/2000 | Endo et al. | 709/203 |
| 6,057,810 A | 5/2000 | Roell et al. | 345/8 |
| 6,057,828 A | 5/2000 | Rosenberg et al. | 345/156 |
| 6,057,856 A | 5/2000 | Miyashita et al. | 345/435 |
| 6,072,466 A | 6/2000 | Shah et al. | 345/156 |
| 6,072,478 A | 6/2000 | Kurihara et al. | 345/302 |
| 6,073,115 A | 6/2000 | Marshall | 705/35 |
| 6,434,604 B1 | 8/2002 | Harada et al. | |

OTHER PUBLICATIONS

Brewer, Stephen et al., "A New World of Animated Discussions: 3D Chat–See why online chats' new visual trappings are the talk of the town," Home PC, CMP Media, 1997, No. 403, p. 88.

Heid, Jim, "Face–to–face online," Macworld, Macworld Communications Inc., vol. 14, No. 1, p. 146, Jan. 1997.

Iworld–ZDNet Offers Virtual Reality on the Web, Newsbytes Inc., Nov. 3, 1995.

New Dimension for 3D chat, Home PC, CMP Media, No. 405, p. 27, 1997.

The Client side of Virtual Worlds (Immersive Systems, Knowledge Adventure Worlds, Apple's QuickTime VR desktop video software, Virtual Games' Stim–Slum computer game), Release 1.0, Edventure Holdings Inc., vol. 94, No. 6, p. 12 (7), Jun. 27, 1994.

D'Amico, Marie, "Who wnats to live in cyberspace? Virtual world developers bet we all do (virtual worlds are not useful nor valuable)," Digital Media, Seybold Publications, Inc., vol. 5, No. 2, p. 9 (4), Jul. 3, 1995.

Vallina, Joe, "This "3D" Hunting Game Takes 1 Step Forward, 10 Steps Back," Computer Gaming World, Golden Empire Publications, Inc., No. 172, p. 299 (1), Nov. 1998.

Virtools to Launch 3D Games Development Tool, Computergram International, Computerwire, Inc., No. 126, Jun. 25, 1998.

Gabriel Knight 3 (Sierra Online's adventure game) (Software Review) (Evaluation), Computer Gaming World, Golden Empire Publications, Inc., p. 62 (1), Jun. 1999.

Joch, Alan, "Enterprises now donning 3–D glasses: 3–D interfaces move to handle corporate e–biz (Technology Information)," PC Week, Ziff–Davis Publishing Company, p. 59, Nov. 8, 1999.

Krista Ostertag, "3D tools for virtual worlds," Varbusiness, CMP Media, No. 1203, p. 24, 1996.

Gordon Brockhouse, "3D Explodes!—New 3D video accelerators and sound cards can add mind–blowing realism to your games," Home PC, CMP Media, No. 503, p. 64, 1998.

Leibs, B., et al., "The Perceptive Workbench: Toward spontaneous and natural interaction in semi–immersive virtual environments," Proceedings IEEE Virtual Reality 2000, IEEE, pp. 13–20, Mar. 18–22, 2000.

Greenhalgh, C., et al., "Creating a live broadcast from a virtual environment," Proceedings of SIGGRAPH 99: 26th Internatioanl Conference on Computer Graphics and Interactive Techniques, IEEE, Aug. 8–13, 1999.

Kaplan, F., et al., "Growing virtual communities in 3D meeting spaces," Virtual Worlds First International Conference, VW '98 Proceedings, IEEE, Jul. 1–3, 1998, (Abstract).

Kyoya, T., et al., "A 3D game with force feedback in a virtual space–virtual Tower of Hanoi," Journal of the Institute of Television Engineers of Japan, IEEE, vol. 49, No. 10, pp. 1347–1352, Oct. 1995, (Abstract).

Vacca, John R., "3D worlds on the Web," Computer Graphics World, Pennwell Publishing Company, vol. 19, No. 5, p. 43 (6), May 1996.

Feiner, Steven K., "Research in 3D user interface design at Columbia University," Feiner@cs,columbia,edu.

Visual Interface, Inc., "The Future of 3D Imaging."

Mohageg, Mike, et al., "A user interface for accessing 3D content on the World Wide Web."

Patent application No. 09/653,276; Specification and Figures 1–14 from Method, System and Computer Program Product for Providing a Two–Dimensional Interface to a Three–Dimensional World, Harvey, William et al.

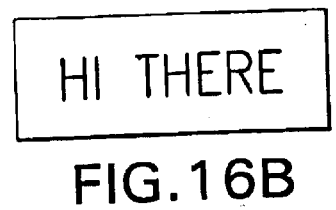
FIG.16A
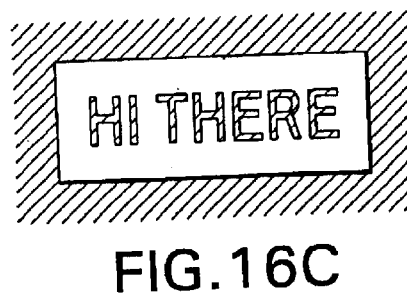
FIG.16B
FIG.16C
FIG.16D
FIG.16F
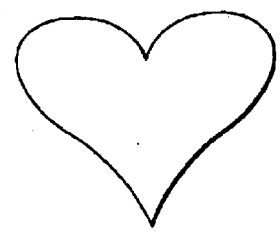
FIG.16G
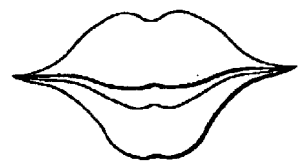
FIG.16H
FIG.16I
FIG.16E

METHOD, SYSTEM AND COMPUTER PROGRAM PRODUCT FOR THE DELIVERY OF A CHAT MESSAGE IN A 3D MULTI-USER ENVIRONMENT

CROSS-REFERENCE TO RELATED APPLICATIONS

This application claims priority to provisional application entitled "User Interface for a 3D World," U.S. patent application Ser. No. 60/202,920, filed on May 9, 2000 (incorporated by reference in its entirety herein).

BACKGROUND OF THE INVENTION

1. Field of the Invention

The present invention relates to a system, method and computer program product for delivering electronic messages. More specifically, the present invention relates to a method, system and computer program for delivering electronic "chat" messages.

2. Related Art

Computers have gained widespread acceptance as a means of communication between individuals. The real-time exchange of messages via a computer, or computer "chat," is a particularly popular method of on-line communication, as it permits the dynamic exchange of messages between remote computer users that is much like a real conversation. For this reason, chat is a particularly effective communication tool for social interaction.

In a typical chat session, when a participant types a line of text into his computer and then presses the Enter key, that participant's words appear in a two-dimensional (2D) window on the computer screens of other participants, who can respond in kind. Two-dimensional chat systems of this type are well known and are commonly implemented through the use of specialized Internet utility programs or via client-server systems such as Internet Relay Chat (IRC).

The use of chat programs in combination with three-dimensional (3D) multi-user environments is also known in the art. In a 3D multi-user environment, computer users interact with digital representations of each other, sometimes called "Avatars," and objects in a commonly-shared virtual 3D space. 3D multi-user environments are often implemented in client-server systems, in which the server maintains a virtual 3D space and the client provides the user interface to that space. Chat is particularly useful in combination with social 3D multi-user environments that permit users to meet and converse with each other in 3D space. In addition, chat is useful with 3D on-line multiplayer games, in which many players interact, either cooperatively or competitively, and must communicate with each in order to respond to real-time events occurring in the 3D game world. In 3D multi-user environments the users typically view the 3D world through a window, or 3D viewport, displayed on their computer screen. Conventional systems that combine chat with a 3D multi-user environment typically display chat messages in a 2D window that is adjacent to, or overlays, the 3D viewport. As such, these systems suffer from a number of disadvantages. For example, by allotting screen space to the 2D chat window, these systems necessarily provide smaller or obscured viewports into the virtual 3D space. As a result, users may have a more difficult time perceiving and responding to events that occur in the 3D world.

Also, these systems require the user to manage it least two interfaces in order to interact with other users, which can be difficult and may cause the user to miss events that occur in the 3D world or lose track of conversations that appear in the 2D window, or both. Because the user is required to deal with two distinct interfaces (2D and 3D) that have very different appearances and do not mesh seamlessly, the user will generally have a less immersive and less intuitive experience.

Conventional systems that use both a 2D and 3D window are particularly disadvantageous in that they make it difficult to locate the digital representation of the sender of any given chat message in the 3D world, as there is no direct connection between the sender's chat message appearing in the 2D window and the sender's Avatar in the 3D world. Some of these systems attempt to establish such a connection by, for example, displaying name tags adjacent to the Avatars in the 3D world and also placing the sender's name adjacent to the sender's chat message in the 2D window. By looking at the name adjacent to the chat message in the 2D window and then scanning the 3D window for an Avatar with a matching name tag, the recipient of the message can attempt to locate the digital representation of the sender in the 3D world. However, because the recipient is required to scan at least two interfaces to locate the sender's Avatar, this solution is less than ideal and can cause the recipient to miss events that occur in the 3D environment as well as lose track of messages appearing in the 2D window. Also, this solution simply does not work when the sender's Avatar is behind the recipient or other wise out side of the view of the recipient's 3D viewport. Similar correlation schemes involving color coding or some other association between the 2D chat message and the Avatars in the 3D viewport suffer from the same disadvantages.

These systems are also disadvantageous in that they do not indicate in 3D space the direction from which a chat message originated. As a result, the recipient of the chat message is not given an indication of the location of the digital representation of the sender in the 3D world.

These systems are also disadvantageous in that chat messages are limited to two-dimensional text, and do not include any graphic, audio or animation component. Thus, senders of chat messages in conventional systems are unable to customize their chat messages with a graphic, audio or animation component, thereby generating a unique "signature" for the sender that enhances the ability of the recipient to identify the sender of the message.

SUMMARY OF THE INVENTION

The present invention is directed to a chat system for delivering a message between a sender and a recipient in a three-dimensional (3D) multi-user environment, wherein the 3D multi-user environment maintains respective digital representations of the sender and the recipient. Embodiments of the invention include a recipient interface that receives a message, maps the message to a texture to generate a textured message, and renders the textured message in the 3D multi-user environment so as to permit the recipient to visually ascertain the location of the digital representation of the sender.

Alternate embodiments of the invention include a sender interface and a recipient interface that includes a recipient viewport. The recipient interface receives a message from the sender interface, maps the message to a texture to generate a textured message, periodically determines the location of the digital representation of the sender and the location of the digital representation of the recipient, and periodically renders the textured message in the three-dimensional multi-user environment along a path between the location of the digital representation of the sender and the location of the digital representation of the recipient, so as to permit the recipient to visually ascertain the location of the digital representation of the sender through the recipient viewport.

In an embodiment of the invention, the sender interface and recipient interface each comprise software modules and the messages are sent over the Internet.

The invention is advantageous in that it permits the delivery of a chat message in a 3D multi-user environment without requiring the use of both a 3D viewport and a separate 2D window. Accordingly, the invention allows screen space to be conserved for the 3D viewport, which provides the user with a better view into the 3D world and thereby generates a more immersive and intuitive experience for the user. In on-line multiplayer games that involve interaction with objects or other players in a 3D world, it is critical to provide as large a viewport as possible so that players can effectively perceive and respond to game events.

The invention is also advantageous in that it permits the delivery of a chat message in a 3D multi-user environment via one integrated viewport, rather than via two or more windows. Because the invention permits the recipient of a chat message to view the chat message and interact with the 3D world via the same interface, the recipient is better able to avoid missing events in the 3D world and/or losing track of chat messages.

Another benefit of the invention is that it permits the recipient of a chat message in a 3D multi-user environment to locate the digital representation of the sender of the chat message in the 3D world, even when the digital representation of the sender is outside the scope of the recipient's 3D viewport.

Yet another benefit of the invention is that it permits the recipient of a chat message in a 3D multi-user environment to determine the direction from which a chat message originated. Accordingly, the recipient of a chat message is given an indication of the location of the digital representation of the sender in the 3D world.

A further advantage of the invention is that it supports chat messages with a graphic, audio or animation component customizable by the sender. The sender is thereby permitted to customize a chat message to generate a unique "signature" that enhances the recipient's ability to identify the sender of the message. The graphic, audio or animation component can also be utilized to indicate the content of the chat message or the intended number of recipients of the chat message.

A further benefit of the invention is that it manages received messages on a 3D viewport in a manner that ensures legibility of received messages and indicates the location of the digital representation of the sender in the 3D world.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE FIGURES

The accompanying drawings are included to provide a further understanding of the invention and are incorporated in and constitute part of this specification. The drawings illustrate the preferred embodiment of the invention and together with the description serve to explain the principles of the invention.

FIGS. 16A, 16B, 16C, 16D, 16E, 16F, 16G, 16H and 16I show example textured messages and animation textures according to embodiments of the invention.

Figure 1:
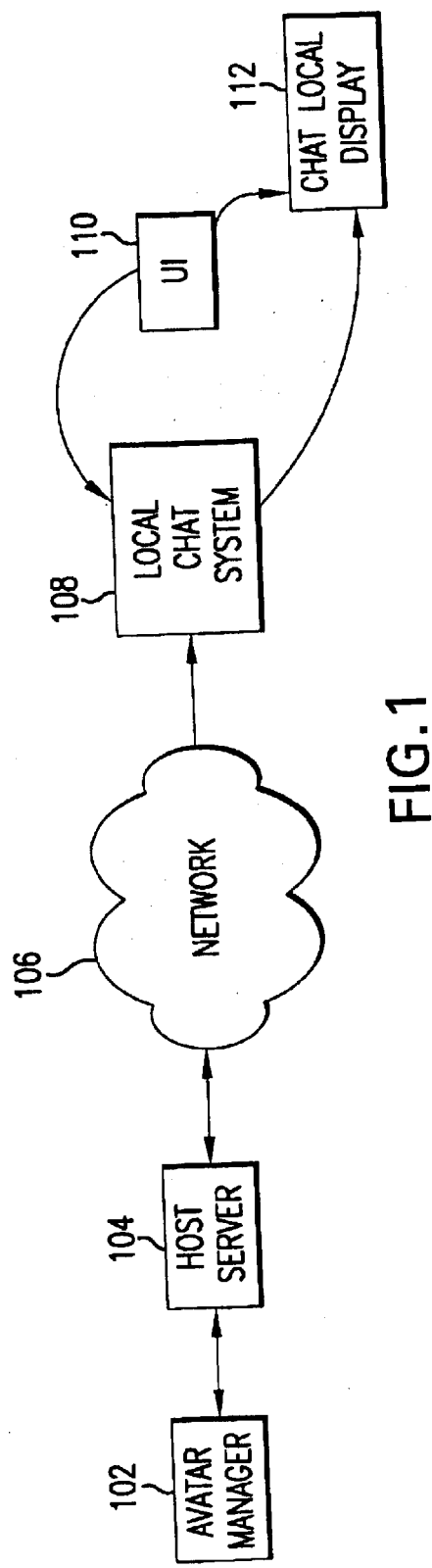
FIG. 1 is a block diagram of a distributed chat interface system according to one embodiment of the present invention.

The present invention will now be described with reference to the accompanying drawings. In the drawings, like reference numbers indicate identical or functionally similar elements. Additionally, the left most digit(s) of a reference number identifies the drawing in which the reference number first appears. Although several preferred embodiments of the present invention are particularly shown and described below, one skilled in the art will appreciate that various changes in forms and details may be made without departing from the spirit and scope of the invention as defined in the appended claims.

DETAILED DESCRIPTION OF THE PREFERRED EMBODIMENTS

A. Overview of the Invention

The present invention is directed to a chat system, method and computer program product for delivering a message between a sender and a recipient in a three-dimensional multi-user environment, in which the three-dimensional multi-user environment maintains a digital representations of the sender and the recipient. The chat system includes a recipient interface. According to the present invention, the recipient interface receives a message, maps the message to a texture to generate a textured message, and renders the textured message in the three-dimensional multi-use environment in a manner that permits the recipient to visually ascertain the location of the digital representation of the sender in the 3D world. The invention will now be further described in reference to FIGS. 1–21.

B. System Architecture Overview

FIG. 1 is a block diagram representing an example operating environment of the distributed chat inter face system of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations.

Referring to FIG. 1, an Avatar manager 102, a host server 104, a network 106, a local chat system 108, a user interface (UI) 110 and a chat local display 112 is shown. Avatar manager 102 and host server 104 are considered server side components of the present invention. Local chat system 108, user interface (UI) 110 and chat local display 112 are considered client side components of the present invention.

Only one Avatar manager 102, host server 104, local chat system 108, user interface (UI) 110 and chat local display 112 is shown for clarity. In general, any number of these components can be included in the distributed chat interface system of the present invention. Each of these components is briefly described next.

Avatar manager 102 is a server side component that handles multiple Avatars. In fact, Avatar manager 102 is responsible for storing all chat messages that are exchanged via the distributed chat interface system. This allows for the persistent storage of chat messages. Persistent storage of chat messages by Avatar manager 102 allows users to access Avatar manager 102 days later to view what was said during a particular chat session in which they participated.

The other server side component is host server 104. Host server 104 receives the chat messages from the client side components via network 106. Host server 104 then provides these chat messages to Avatar manager 102 for persistent storage. Host server 104, among other things, is responsible for hosting chat (and/or game playing) and communication (including control and data flow) between a user's interface and the chat (and/or game play) environment. In addition, host server 104 demultiplexes chat messages and requests for data that arrive from the client side components and from other Avatar managers.

Network 106 connects the server side and client side components of the present invention. Network 106 can be any type of computer network or combination of networks including, but not limited to circuit switched and/or packet switched networks. In one example, network 106 includes the Internet. Any conventional communication protocols can be used to support communication between the components of the distributed chat interface system. For example, a TCP/IP suite can be used to establish links and transport data. A World Wide Web-based application layer and browser (and Web server) can also be used to further facilitate communication between the components shown in FIG. 1. However, these examples are illustrative. The present invention is not intended to be limited to a specific communication protocol or application, and other proprietary or non-proprietary network communication protocols and applications can be used.

Local chat system 108 is a client side component and is responsible for managing a user's chat file. A user's chat file is a file that contains chat messages sent both from and to the user during the particular session. These chat messages are eventually stored by Avatar manager 102 for persistent storage and later retrieval by the user. Local chat system 108 is also responsible for receiving chat messages and dispatching them to the correct user (or Avatar), managing system messages, and so forth. The various components that make up local chat system 108, and the interaction between them, will be described in detail below with reference to FIG. 2.

UI 110 is also a client side component and is responsible for accepting and sending user input (or interface) events to local chat system 108 and chat local display 112. Examples of user input events include, but are not limited to, relevant button clicks and keyboard events when the user types in a chat message.

Chat local display 112 maintains and tracks a list of chat message wads. Each chat message wad contains one chat message, along with state and structures required to animate and display the chat message in the 3D world. The chat message includes the message sent by the user, the time, recipient animation attributes, appearance attributes, and so forth. The chat message wad of the present invention is described in more detail below with reference to FIGS. 5 and 6. Internally, chat local display 112 includes a data structure that grows as number of active chat message wads grow. Chat local display 112 also includes logic to maintain and track the list of chat message wads. Chat local display 112 is described in more detail below with reference to FIGS. 3 and 11.

Prior to describing the various components that make up local chat system 108 (and the distributed chat interface system in general), and the interaction between them, the user interface objects (or elements) of the present invention will be described next with reference to FIG. 11.

C. User Interface Objects of the Present Invention

The present invention provides these user interface objects to provide cues to guide the user from the 3D world to the 2D world, and vice-versa. Therefore, most of the components that make up the distributed chat interface system perform functions or tasks that create and/or manage the user interface objects. The exemplary screen layout of FIG. 11 illustrates the default locations and functionality of user interface objects available to the user according to one embodiment of the present invention. These objects include, but are not limited to, a 3D viewport 1100, one or more Avatar name tags 1102, a local chat handle 1104, one or more local chat message wads 1106, a local chat area 1107, a chat entry area 1108 (which includes a chat mode button 1110, a specific recipient list 1109 and a chat text entry area 1112), a dashboard 1114, a items window 1116 and an exemplary tool tip 1118. Each of these user interface objects are described next.

Figure 11:
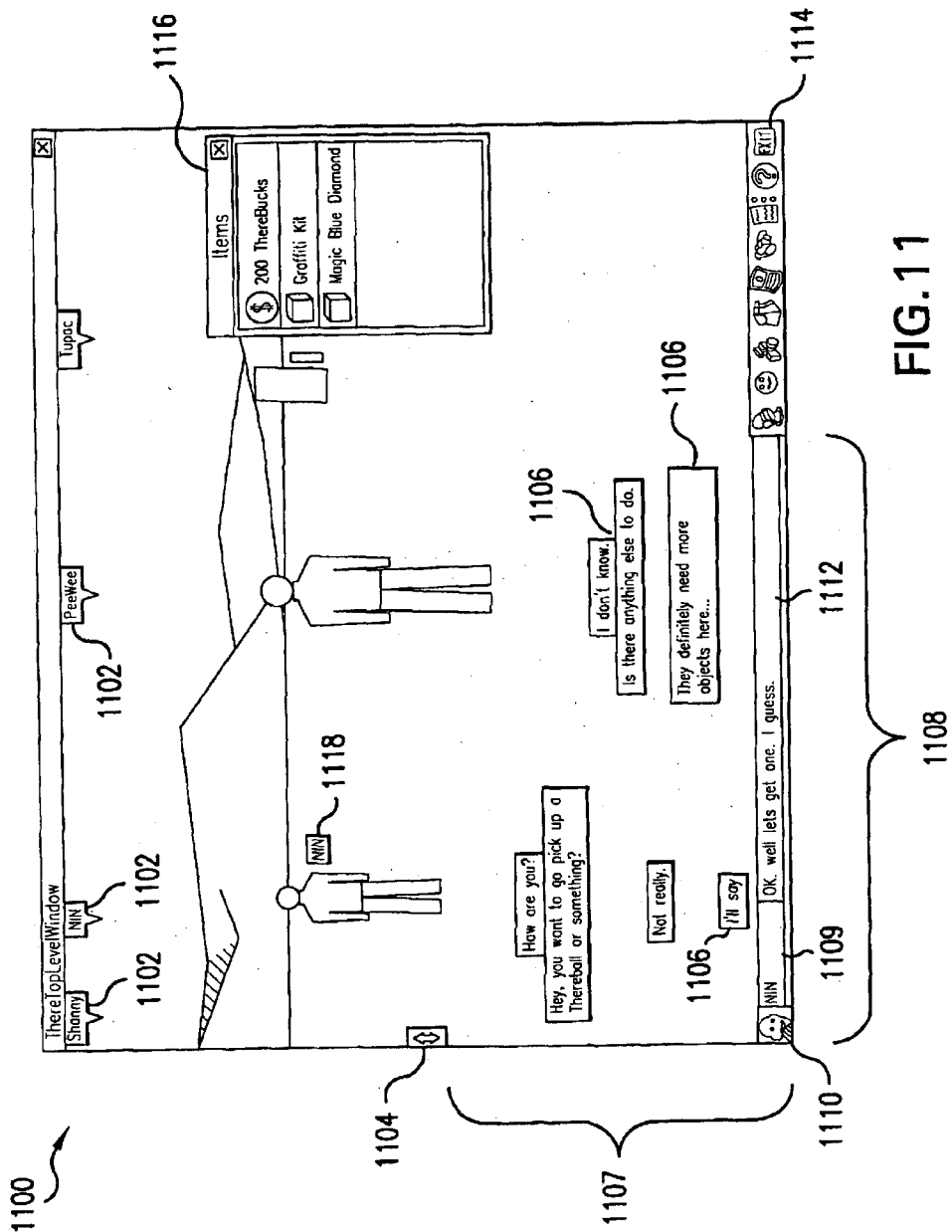
FIG. 11 is an exemplary screen layout illustrating the default locations and functionality of user interface objects available to the user according to an embodiment of the present invention.

In FIG. 11, the exemplary screen layout includes 3D viewport 1100. In one embodiment of the present invention, 3D viewport 1100 is the entire screen. Using the entire screen for 3D viewport 1100 is advantageous in that it provides as much screen space as possible to the 3D viewport, so as to allow the user a better view into the 3D world and thereby generate a more immersive and intuitive experience for the user. In on-line multiplayer games that involve interaction with objects or other players in a 3D world, it is critical to provide as large a viewport as possible so that players can effectively perceive and respond to game events. In addition, 2D user interface objects are overlaid on 3D viewport 1100 over the view into the 3D world to help create one experience for the user. A camera is a logical object that follows the user's Avatar and provides the perspective on the rendered scene. What is rendered in the 3D viewport 1100 is determined by the camera's position, orientation and field of view. The windshield of the present invention is a plane projected in front of a user's camera. Objects "stuck to" the windshield appear to be hovering in 3D space.

A considerable portion of the windshield space (i.e., 3D viewport 1100) is occupied by the user interface objects related to local chat. Local chat refers to text chat with other Avatars who are within a given radius (e.g., 25 M in a virtual game world distance) from a user's Avatar. Unlike other types of instant messaging, the present invention provides a physical world where proximity to others allows users to share physical, as well as social, experiences other than chatting.

Local chat handle 1104 allows users to set the height of local chat area 1107. Thus, the height of local chat area 1107 varies. Local chat handle 1104 can also be used to get additional chat options (such as chat logs) by right clicking on local chat handle 1104. Local chat handle 1104 is displayed by default, but may be removed by the user as an option.

One or more local chat message wads 1106 contain chat message objects from Avatars and appear in the local chat area 1107 between the local chat handle 1104 and the bottom of 3D viewport 1100. The chat message will center itself horizontally on the screen so that it is lined up with the Avatar that sent the message. The chat message continues to horizontally align itself as the Avatar moves in the 3D world. In order to be less obtrusive, older message objects become more translucent as they go higher up local chat area 1107 (i.e., as they move up the screen). However, at any time no two chat message wads 1106 overlap. This is due to the fact that message objects in the chat message wads 1106 occupy different rows in local chat area 1107. The present invention also allows the user to recreate the flow of the conversation at any time by following the message objects on the screen from the oldest message (at the top of local chat area 1107) to the newest message (at the bottom of local chat area 1107).

Also there is a 3D animation or message transition from the sender Avatar to local chat area 1107 when a message object is sent. This animation helps to further link the chat message wad 1106 with the sender in the 3D world. Thus, every new message object is added to local chat area 1107 with a 3D animation. This transition can be customized by the sender (e.g., path shape, trails, speed, etc.) and helps to cue the user as to the location of the Avatar communicating with him or her.

The name of the Avatar is not needed in the message object because of the way the user interface of the present invention is designed. Chat message wads 1106 are linked to their author both spatially and aesthetically. The customized stylistic choices on the part of the sender create a "voice" for their text chat which will soon become familiar to the users they frequently encounter in the present invention. This allows the present invention to save screen real estate by omitting the sender's name from the standard display of chat message wads 1106. At any time, a user may mouse over a message object and be reminded who sent it with a pop-up tool tip.

As mentioned above, the number of local chat message wads 1106 increases as more chat messages are received from an Avatar. Local chat message wad 1106 is made up of multiple objects, including: the actual chat (i.e., text) message, texture, some drawing parameters about the texture, the author's name of the message, etc. The objects of chat message wad 1106 will be described in detail below with reference to FIGS. 5 and 6.

Local chat area 1107 is the area on 3D viewport 1100 between local chat handle 1104 and chat entry area 1108. Local chat area 1107 is the area when one or more local chat message wads 1106 are displayed.

Chat entry area 1108 is comprised of chat mode button 1110 and chat text entry area 1112. Chat mode button 1110 allows the user to cycle through various modes of communication. The default mode is "speak" mode. This sends messages to all users in local chat area 1107. "Whisper" mode allows a user to send a private message to a single other user or Avatar in local chat area 1107. When in whisper mode, a list box with the names of local Avatars and the members of a user's buddy list appears to select a recipient. This entry area is also configurable from the outside, to allow it to be configured with a recipient when the user double clicks on an Avatar figure or Avatar name tag 1102. The final chat mode is "shout" mode which reaches all users currently known by the user's server.

Chat text entry area 1112 is a translucent text edit box that the user types in his or her message. Chat text entry area 1112 also indicates to which Avatar the user is "speaking," "whispering" or "shouting".

One important challenge faced in presenting the local chat is tying the messages to the Avatars sending them in the 3D world. It is important for There users to be able to make visual contact and know that they have done so. However, because the Avatars may be obscured, in a crowd or behind the user's camera, it is sometimes hard just to identify an Avatar's position in the world. To address that problem, the present invention provides Avatar name tags 1102.

Avatar name tags 1102 are located at the very top of the screen directly above the Avatars' heads. Name tags 1102 serve both to identify Avatars in the local area and to identify the chat associated from that Avatar by aligning the name tag horizontally on the screen with the Avatar and all of the messages the Avatar sent. Name tags 1102 track an Avatar's motion in the 3-D world and appear far right or far left for Avatars not in view. An arrow below Avatar name tag 1102 serves both to remind the user of the other Avatar's position and provides an easy place for the user to click to bring a name tag to the foreground in the event that two name tags overlap. Avatar name tags 1102 are displayed by default, but could be removed by the user as an option. In an embodiment of the present invention, an Avatar's name tag 1102 automatically pops up to the front of other objects displayed on 3D viewport 1100 when a new message object arrives for that Avatar. Avatar name tags 1102 are ordered (on the z plane from the camera's perspective) based on distance from the user's Avatar to the Avatar for the name tag.

In an embodiment of the present invention, Avatar name tags 1102 indicate to the user which Avatars are in "hearing" range of the user's Avatar. This is done by displaying ears (or another indicator) on the name tag of all Avatars within "hearing range" of the user's Avatar. Once an Avatar is not within "hearing range", then the ears on the Avatar's name tag disappears. This indicates to the user which Avatars the user can and cannot contact in local chat of the present invention. Because of network delays, it is possible that at times the user may think a particular Avatar is within "hearing range", and at the same time that same Avatar may not believe it is within "hearing range" of the user. Therefore, the calculation of which Avatars are within the "hearing range" is done by the client side components (i.e., locally).

Dashboard 1114 is the user's jumping off point for all other (non local chat related) user interface objects. It includes icons for commonly used actions toolbars and windows. Dashboard 1114 is essentially a toolbar. The idea is to use a very small portion of the screen to allow the user access to functionality they might need. This functionality must be broken down into several main categories, which then receive icons on the dashboard. Depending on the importance of a given function, it may map directly to one of these icons (such as enabling voice chat) or may be nested in a configuration page that is brought up by the icon (such as customization options). Stylistically, the dashboard should also tie closely with chat entry area 1108 since they share the bottom of the screen and are the only two objects that are always visible.

Items window 1116 is a floating window that displays the user's items including, but not limited to, any weapons, money, and so forth, that the user has to interact with the present invention. Items window 1116 be moved, closed or minimized. In addition, items window 1116 has a title bar, border and/or background color. Items window 1116 may be translucent so as to not completely obscure the action in the 3D world.

Exemplary tool tip 1118 floats over the mouse, and in this case displays the name of the Avatar. Almost everything in the present invention can provide tool tip text to a tool tip manager. The tool tip manager is responsible for determining who should display a tool tip and render it for the user. The tool tip manager of the present invention makes up a part of the basic user interface element (or object) interaction provided to users. Other parts of the basic user interface object interaction includes a drag and drop manager and a pull down menu manager. All three are described in more detail with reference to FIG. 4 below. Next, the various components that make up local chat system 108, and the interaction between them, will be described with reference to FIG. 2.

D. Local Chat System of the Present Invention

Figure 2:
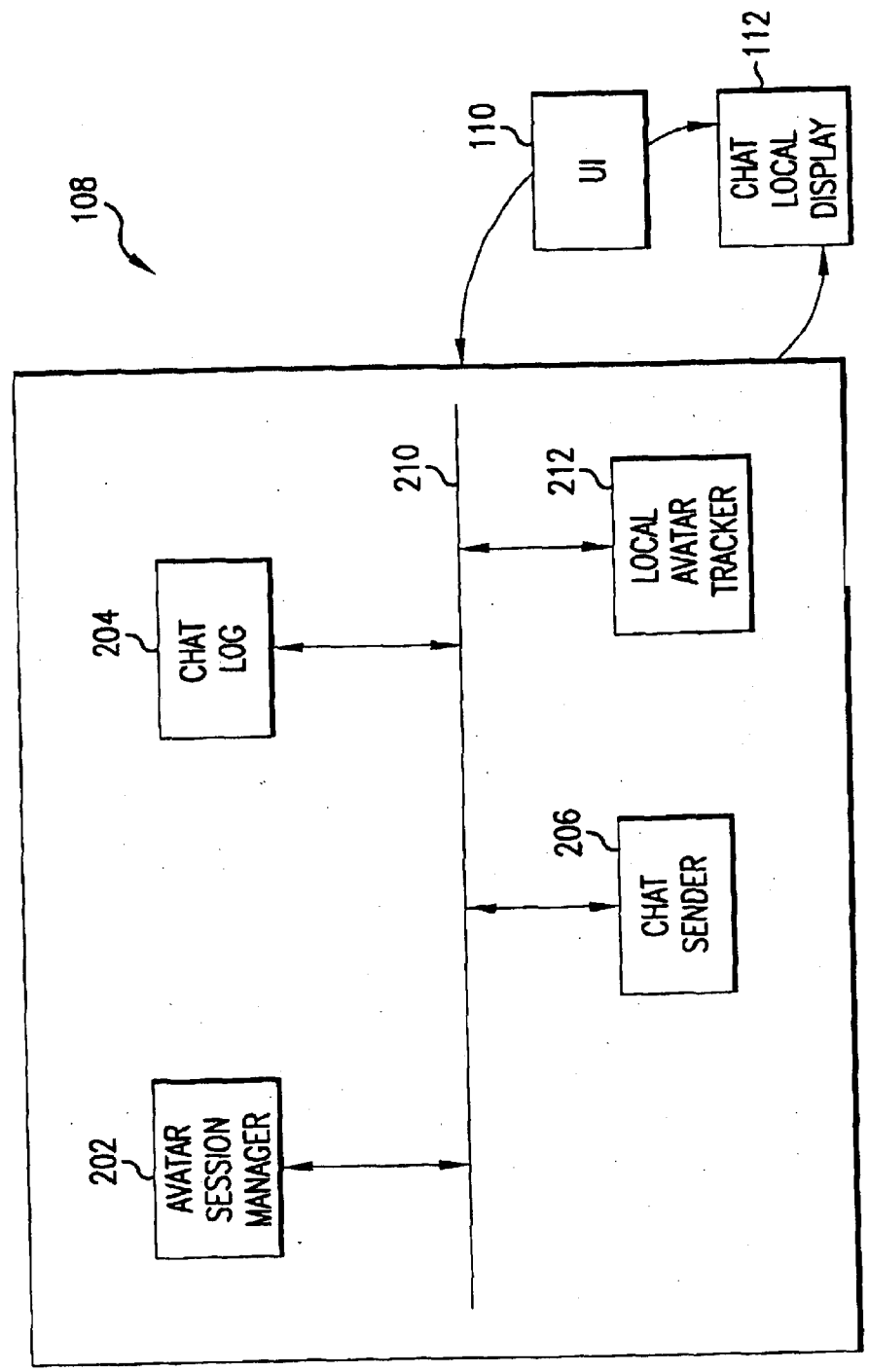
FIG. 2 is a high-level block diagram of an example local chat system according to one embodiment of the present invention.

In FIG. 2, local chat system 108 includes an Avatar session manager 202, a chat log 204, a chat sender 206 and a local Avatar tracker 212. As stated above, local chat system 108 is a client side component and therefore focuses on the current or active chat session that involves the user. Chat log 204 stores all of the messages sent to the user. These messages are sent via network 106 from host server 104 and Avatar manager 102 (i.e., the server side components of the present invention). As stated above, Avatar manager 102 handles multiple Avatars and stores all messages sent to the Avatars. Therefore, any messages sent to the user (or the user's Avatar) is also stored by Avatar manager 102. Chat log 204 polls Avatar massager 1102 to determine if any new messages have been sent to the user. How this polling may be accomplished is described in detail with reference to FIG. 4 below. If chat log 204 receives a nest message for the user it then dispatches the message to chat local display 112.

Chat sender 206 manages all messages sent from the user to other Avatars. These messages are sent via network 106 to host server 104 and Avatar manager 102. How this is accomplished by the present invention will be further explained with reference to FIG. 4 below.

Finally, local Avatar tracker 212 manages Avatar name tags 1102 (FIG. 11). Local Avatar tracker 212 is constantly polling to find the current positions of Avatars in 3D viewport 1100 so to reposition Avatar name tags 1102 accordingly. As stated above, in an embodiment of the present invention, Avatar name tags 1102 are located at the very top of the screen directly above the Avatars' heads. Name tags 1102 serve both to identify Avatars in the local area and to identify the chat associated from that Avatar by aligning Avatar name tags 1102 and chat wads on the same horizontal plane. Name tags 1102 track an Avatar's motion in the 3-D world and appear far right or far left for Avatars not in view. Chat local display 112 is described next with reference to FIG. 3.

E. Chat Local Display of the Present Invention

Figure 3:
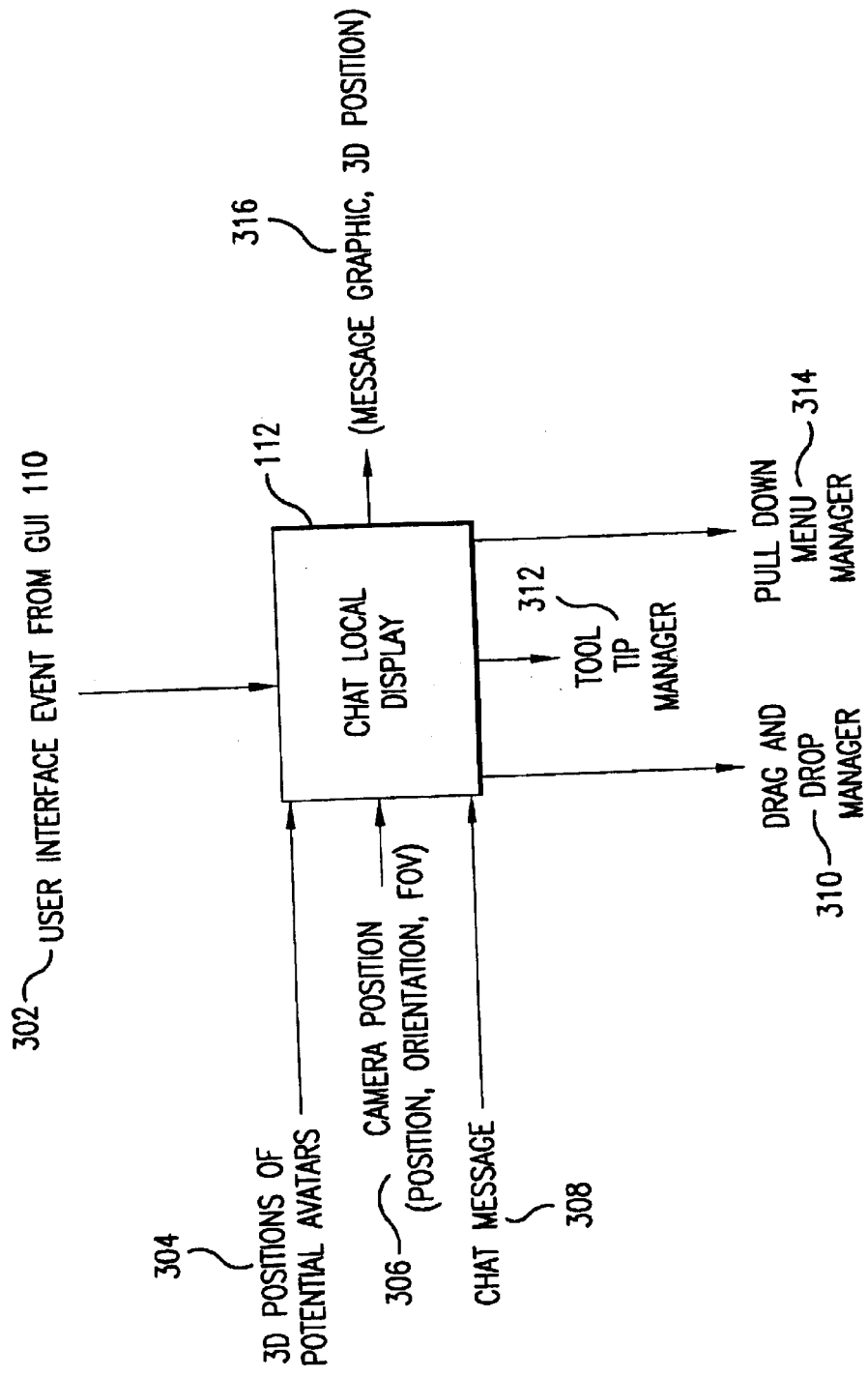
FIG. 3 is a block diagram that illustrates the inputs and outputs of the chat local display according to one embodiment of the present invention.

In FIG. 3, chat local display 112 receives inputs from various components of local chat system 108 (including 3D positions of potential Avatars 304, current camera position 306 and a text chat message 308). Chat local display 112 may also receive a user interface event 302 from UI 110. Based on the type of user interface event 302, chat local display 112 informs either a drag and drop manager 310, a tool tip manager 312 or a pull down menu manager 314 to manage user interface event 302. Chat local display 112 uses inputs 304, 306 and 308 to produce the message graphic in 3D and its 3D position, as indicated by output 316.

Inputs 304, 306 and 308 will be described first. Input 304 consists of the 3D positions of potential Avatars that chat local display 112 must be aware of in order to determine the 3D position of Output 316. Input 304 is sent to chat local display 112 by local Avatar tracker 212.

Input 306 consists of the camera position of the user, among other things. The camera position is indicated by three values including: position, orientation and the field of view (fov). What is rendered in the 3D viewport 1100 is determined by the camera's position, orientation and field of view. Input 306 is also sent to chat local display 112 by local Avatar tracker 212.

Input 308 is the text chat message that one Avatar has sent to another. Input 308 is sent to chat local display 112 by chat log 204.

As described above, chat local display 112 maintains and tracks a list of chat message wads. Each chat message wad contains one chat message, along with state and structures required to animate and display the chat message in the 3D world. The chat message includes the message sent by the user, the time, recipient animation attributes, appearance attributes, and so forth. Chat local display 112 takes input 308 (i.e., text chat message) and creates a new chat message wad. Also described above, is how chat local display 112 handles the 3D animation or message transition from the sender Avatar to local chat area 1107 when a message object is sent. This animation helps to further link the chat message wad 1106 with the sender in the 3D world. Every new message object is added to local chat area 1107 with a 3D animation. The transition helps to cue the user as to the location of the Avatar communicating with him or her. This transition can be customized by the sender (e.g., path shape, trails, speed, etc.) and are stored as objects in the chat message wad 1106. The objects of chat message wad 1106 are described next with reference to FIGS. 5 and 6.

Figure 5:
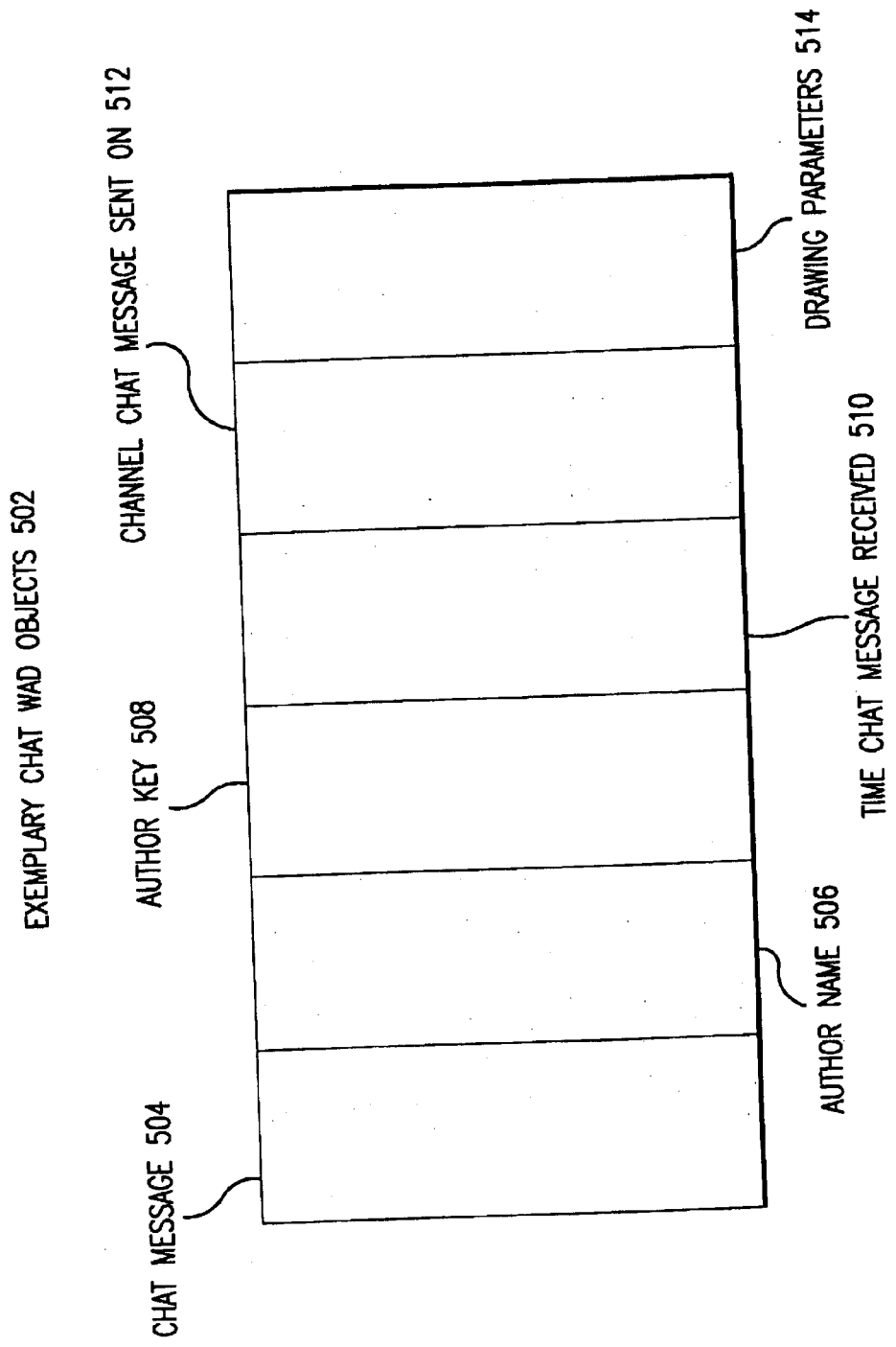
FIG. 5 is an exemplary chat message wad object according to an embodiment of the present invention.
Figure 6:
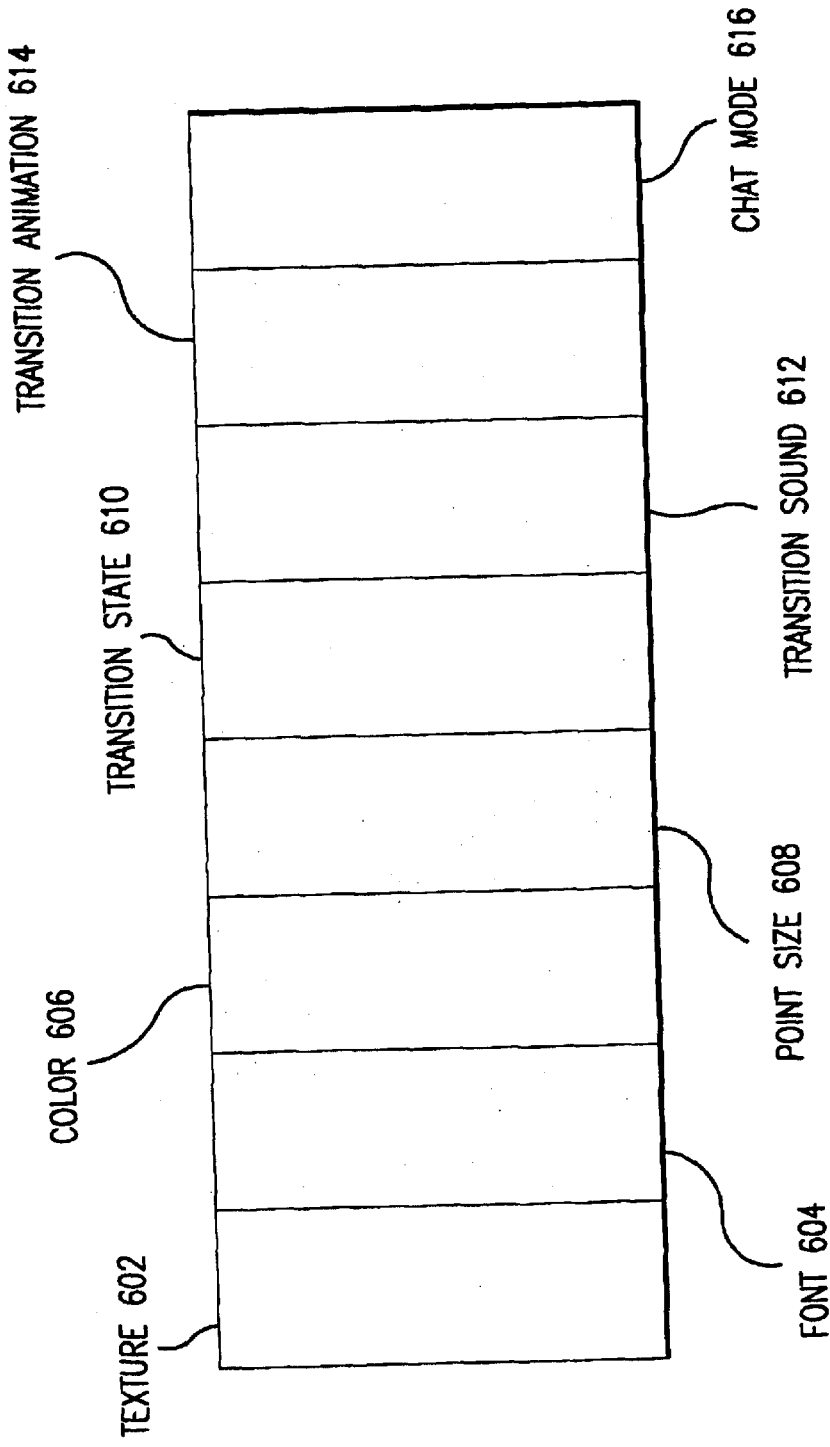
FIG. 6 is an exemplary drawing parameters object of the chat message wad according to an embodiment of the present invention.

FIG. 5 illustrates that exemplar) chat wad objects 502 include a chat message object 504, an author name object 506, an author key object 508, a time object 510 indicating when the chat message was received, a channel object 512 indicating on which channel the chat message sent, and a drawing parameters object 514. As illustrated in FIG. 6, drawing parameters object 514 is further broken into a texture object 602, a font object 604, a color object 606, a point size object 608, a transition state object 610, a transition sound object 612, a transition animation object 614 and a chat mode object 616. How chat local display 112 uses chat wad objects 502 to accomplish the transition (or animation) is described in detail below in Section I with references to FIGS. 15–21.

F. User Interaction with the Present Invention

User interface event 302 may be the result of user interaction with one or more user interface objects described above with reference to FIG. 11. Once chat local display 112 receives a user interface event 302 from UI 110, chat local display 112 determines whether to send the event to either drag and drop manager 310, tool tip manager 312 or pull down menu manager 314 to carry out event 302. User interaction with the present invention is next described in more detail.

The following table illustrates a partial list of user interaction with the user interface objects of the present invention, along with each interaction's triggered response, as they relate to the mouse interface of the present invention.

| USER ACTION | TRIGGERED RESPONSE |
| --- | --- |
| Mouse hovers over an object. | A floating tool tip is brought up near the cursor. |
| Left Click | Can be used to select an object. menu item or pull up a tool tip. |
| Right click | A context sensitive drop down menu of object interactions is displayed near the cursor. |
| Double (left) click | Executes default object action |
| Drag and Drop (with left mouse button) | Used to move objects around the world and onto other objects, combine objects, equip objects use one object on another object (e.g., key on door), etc. |

The tool tip and right-click functions are key parts of a user's interaction with the present invention. Most user interface objects in FIG. 11 support these two functions. These functions aid a user in his or her interaction with the present invention. In fact, users can identify an element or object by merely mousing over it and determining what they can do to it with the right-click menu. Furthermore, this right click menu also clearly identifies the default interaction by rendering the option in a different style. In this way an advanced user will know that the next time they encounter the object they can just double click to perform that action. Note that the list of object interactions, and the default may be different depending on the current context. For example, a carriable item may have a default action to pick it up when on the ground, but default to using or examining it once in the user's inventory.

To facilitate the user's dealings with items in their possession, objects in item window 1116 (FIG. 11) support all the same methods of interactions as they do in the 3D world. The present invention makes no distinction between objects currently represented in 2D or 3D.

Drag and drop manager 310 supports the drag and drop function of the present invention. Dragging and dropping items is supported to perform actions that move an object from one place to another. A prime example is picking up and dropping objects in the 3D world. Picking up an item is possible by dragging it from the 3D world onto either the user's Avatar or item window 1116. When an object from the 3D world is dragged, an icon of the object is used to represent it. This same icon is used to represent the object in all 2D interfaces (such as in item window 1116 and trade windows). The drag and drop function may also be used to initiate interactions between different objects. In order to make it clear if dropping a dragged item in a given place will produce a response, the dragged icon may change to indicate if something is willing to accept the dragged object. In the case where more than one interaction is possible, a menu of possible interactions between objects could be brought up when the object is dropped. How the user can interact with other Avatars is described next.

Avatars in 3D viewport 1100 can be interacted with in many of the same ways as other objects in 3D viewport 1100. However, because user to user interactions are a primary focus of the present invention, it also supports additional features. One important feature that is provided by the present invention is the atomic exchange of virtual possessions through a trade window. The trade window can be brought up by dragging an item from the user's item window 1116 onto another Avatar or directly onto the trade window. Additional interactions are available for users to customize their communication to other users (or Avatars) by adding them to their buddy or ignore lists. These options can be accessed through drop down menus (via pull down menu manager 314). This is available by right-clicking other Avatars or their name tags. Also, private messages can be "whispered" to other Avatars by double-clicking or through the right-click menu. Communication between components of the distributed chat interface system is described next with reference to FIG. 4.

G. Communication Between Components of the Present Invention

Figure 4:
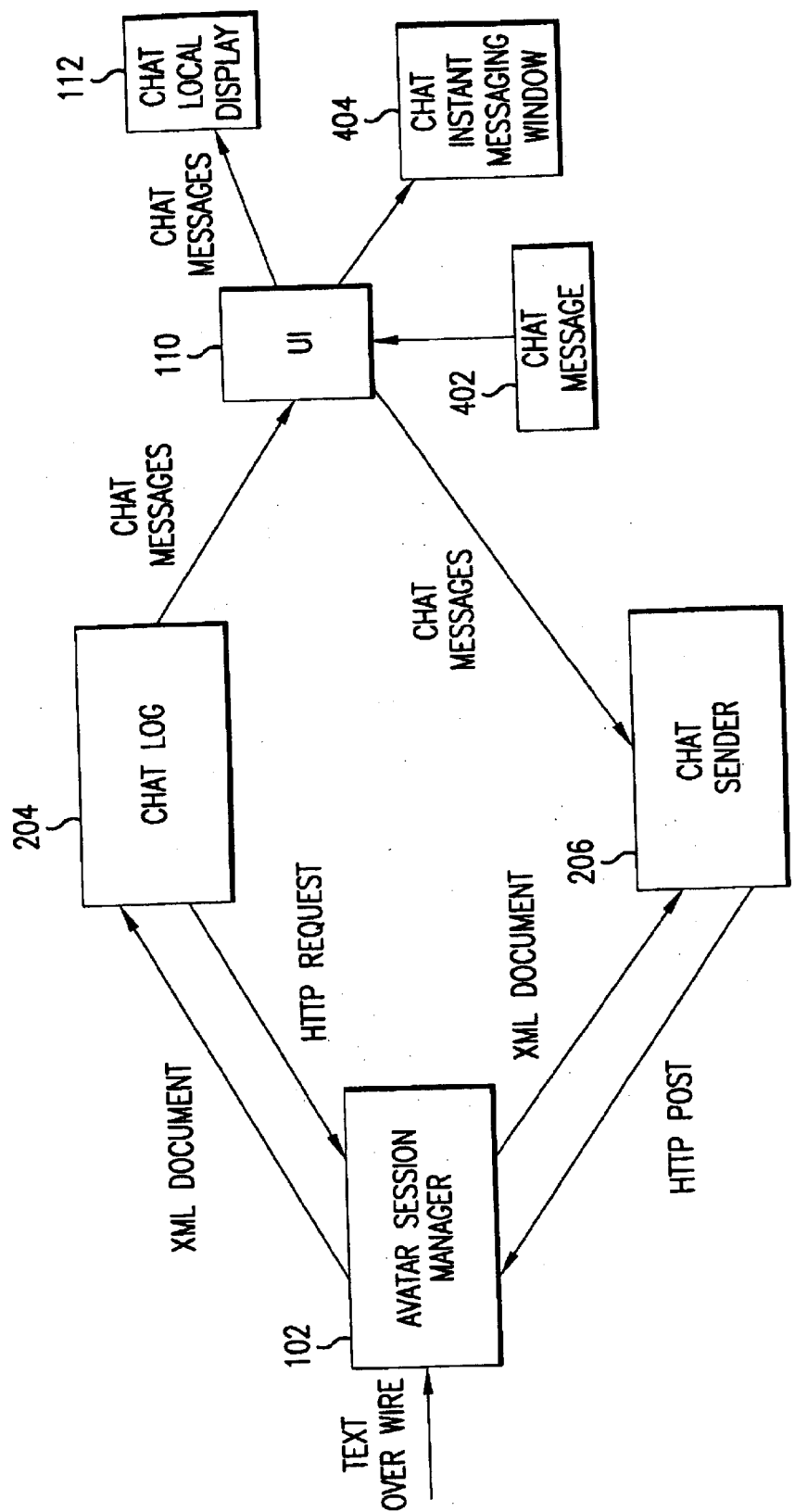
FIG. 4 is a message flow diagram of the components of the distributed chat interface system according to an example implementation of the present invention.

FIG. 4 is a message flow diagram illustrating communication between some of the components of the distributed chat interface system to facilitate chat according to an example implementation of the present invention. The components shown in FIG. 4 include Avatar manager 102, chat log 204, chat sender 206, UI 110, chat local display 112, a chat message 402 and a chat instant messaging window 404. As introduced above with reference to FIG. 2, chat log 204 stores all of the messages sent to the user. These messages are sent via network 106 from host server 104 and Avatar manager 102 (i.e., the server side components of the present invention). As stated above, Avatar manager 102 handles multiple Avatars and stores (on persistent storage) all messages sent to the Avatars. Therefore, any messages sent to the user (or the user s Avatar) is also stored by Avatar manager 102.

Chat log 204 does a polling on Avatar manager 102 to determine if any new messages have been sent to the user. In one embodiment of the present invention, network 106 is the Internet. Therefore, chat log 204 must communicate with Avatar manager 102 via the Internet. In an embodiment of the present invention, chat log 204 does the polling on Avatar manager 102 by sending a request using the Hyper-Text Transfer Protocol (HTTP). HTTP is well known in the relevant art.

Once Avatar manager 102 receives the HTTP request from chat log 204, Avatar manger 102 sends a Extensible Markup Language ("XML") document to chat log 204. The XML document is implemented as a tree data structure. XML is a presentation markup language and is used as a data description language. Tree data structures and XML are also well known in the relevant art. Once chat log 204 receives the XML document from Avatar manager 102, chat log 204 traverses the tree data structure and makes a decision as to what types of actions need to be taken. For example, if chat log 204 determines that a new chat message has been sent to the user, then chat log 204 sends the chat message to chat local display 112 via UI 110 (as illustrated in FIG. 3 with chat message 308).

Figure 7:
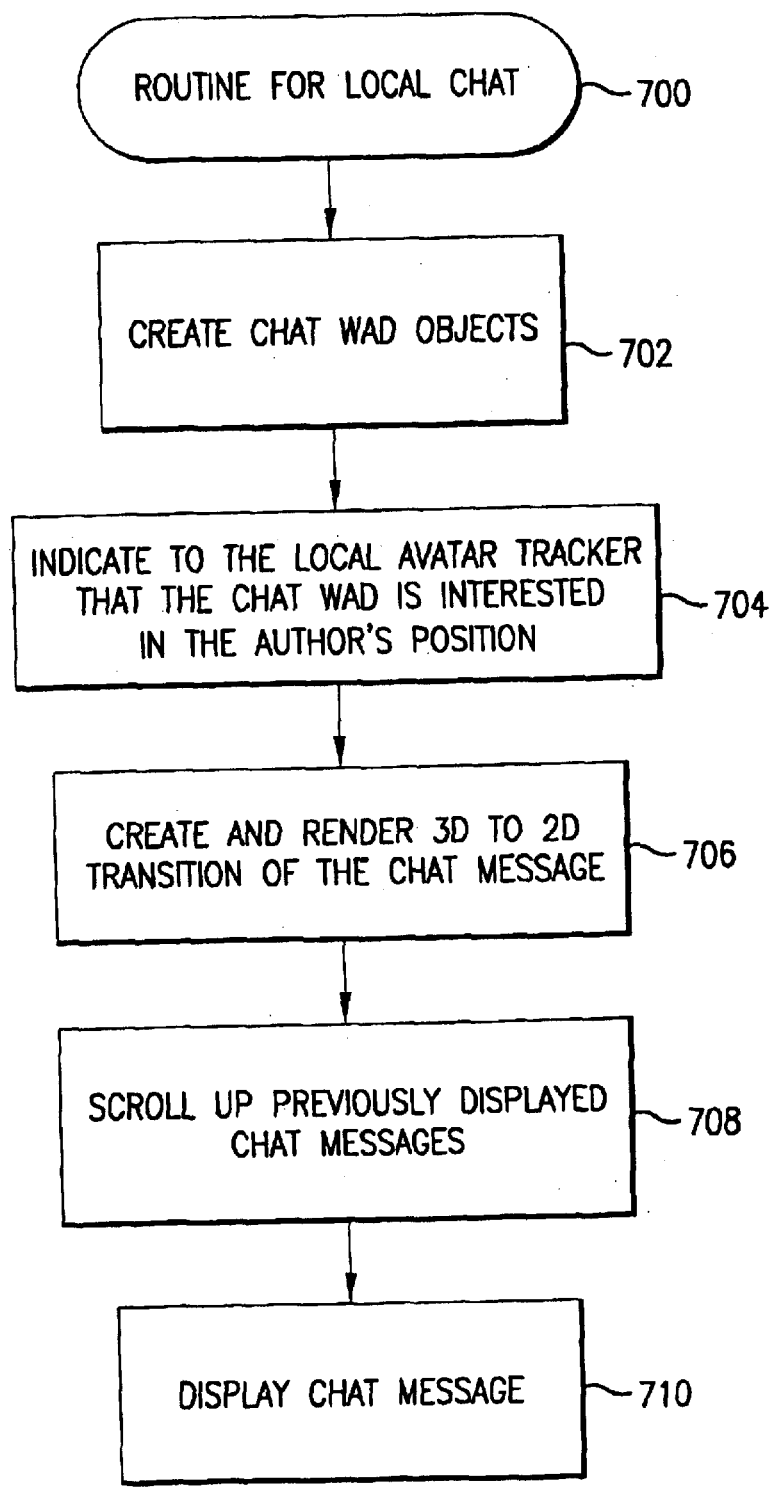
FIG. 7 is a flowchart that describes the high level routine for local chat according to an embodiment of the present invention.
Figure 12:
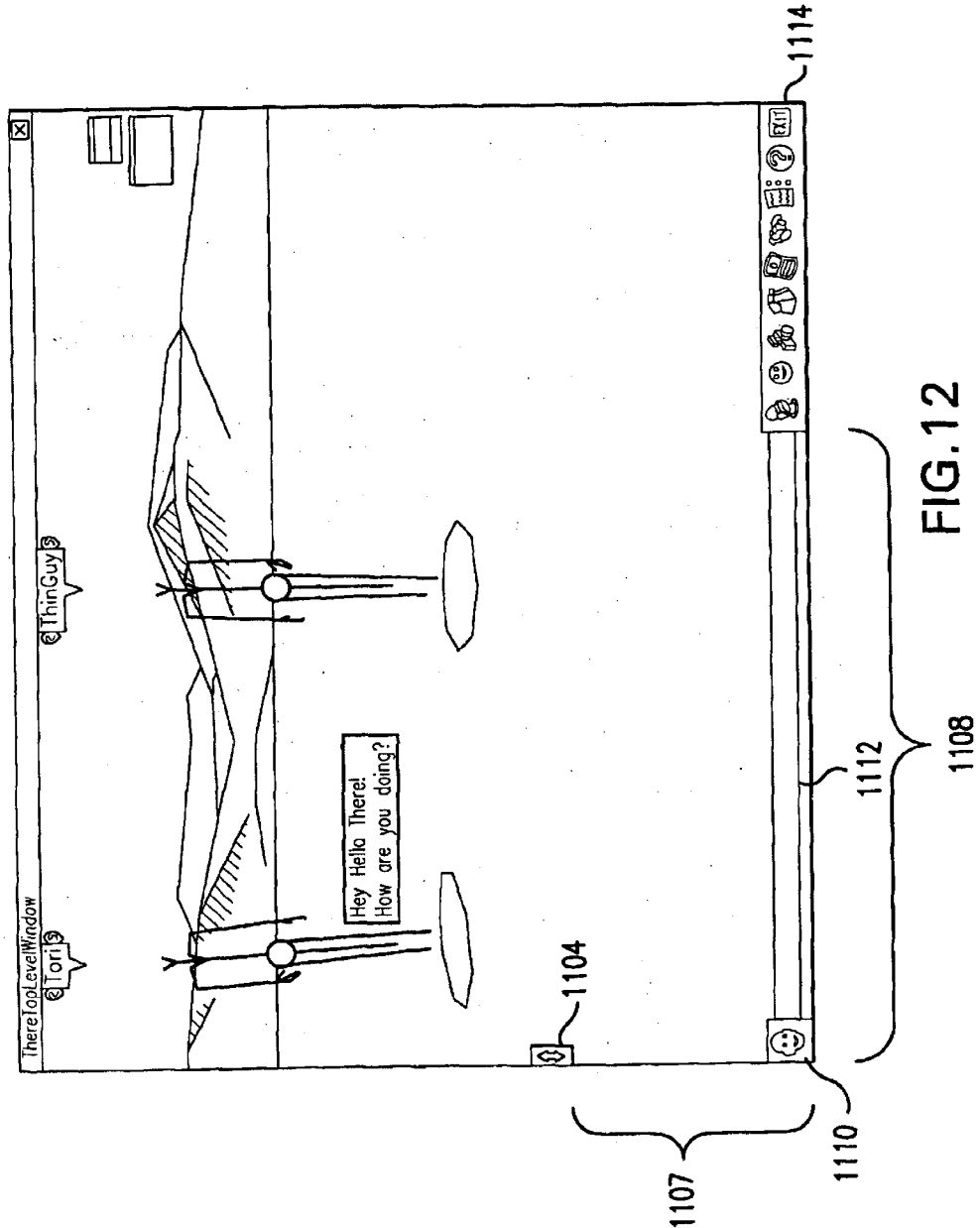
In FIGS. 12, 13 and 14 are exemplary screen shots illustrating local chat according to an embodiment of the present invention.
Figure 13:
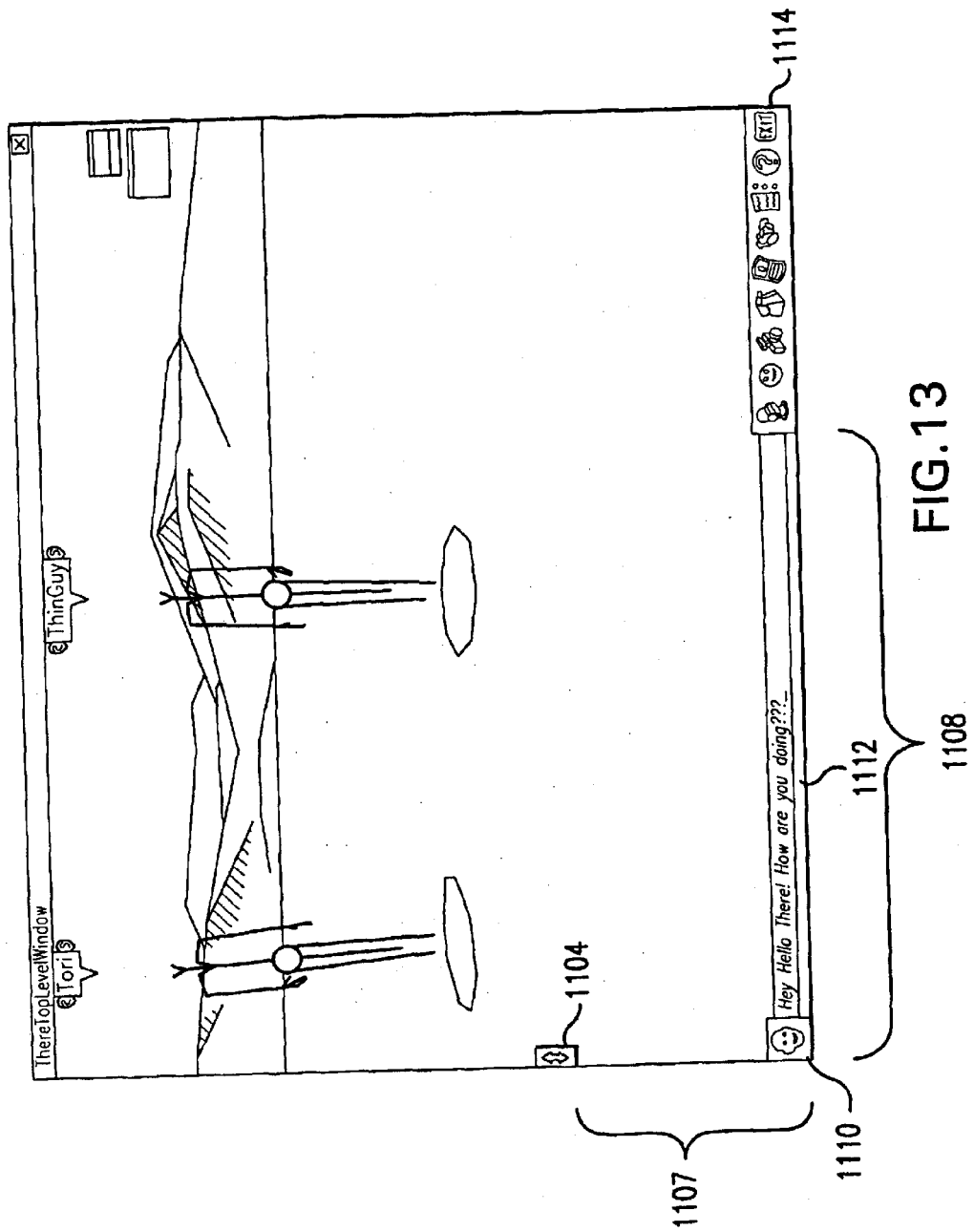
Figure 14:
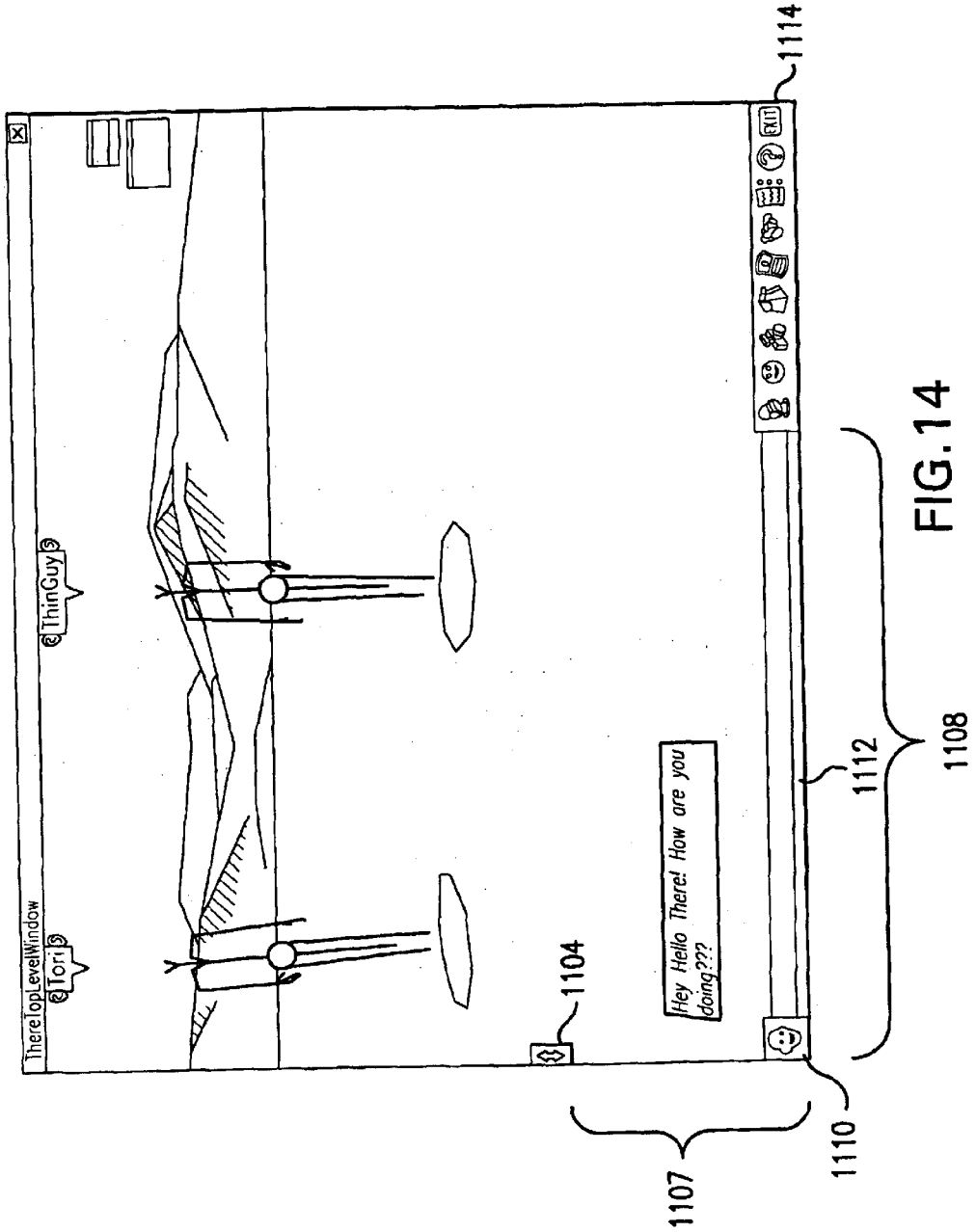

Chat sender 206 routes all messages sent from the user to other Avatars. As shown in FIG. 4, the user enters chat message 402 into UI 110. UI 110 forwards chat message 402 to chat sender 206. Chat sender 206 forwards chat message 402 to all relevant Avatar managers 102 via network 106 and host server 104. When network 106 is the Internet, chat sender 206 sends the chat message via a HTTP post. Exemplary screen shots in FIGS. 12–14 illustrate this sequence of events. In FIG. 13, the user has entered the chat message "Hey Hello There! How are you doing???" into chat text entry area 1112. In FIG. 12, the 3D chat message is flying through the chat text entry area 1112. In FIG. 14, chat local display 112 has already completed the transition and has displayed the chat message in local chat area 107 under the appropriate Avatar. As stated above, local chat refers to text chat with other Avatars who are within a given radius (e.g., 25 M) from a user's Avatar. FIG. 7 is a flowchart that describes the high level routine for local chat of the present invention.

H. Routine for Local Chat of the Present Invention

In FIG. 7, flowchart 700 starts at step 702. In step 702, chat local display 112 creates the necessary chat wad objects 502 (FIG. 5) for the new chat message. Control then passes to step 704.

In step 704, chat local display requests the author/Avatar's 3D position from local Avatar tracker 212 (FIG. 2). The author/Avatar is the author of the new chat message. Control then passes to step 706.

In step 706, chat local display creates and renders the 3D to 2D transition of the chat message. Control then passes to step 708.

In step 708, chat local display 112 scrolls up the chat messages that have previously been displayed. Control then passes to step 710.

In step 710, chat local display 112 displays the chat message at the appropriate location in local chat area 1107. Flowchart 700 ends at this point.

Figure 8:
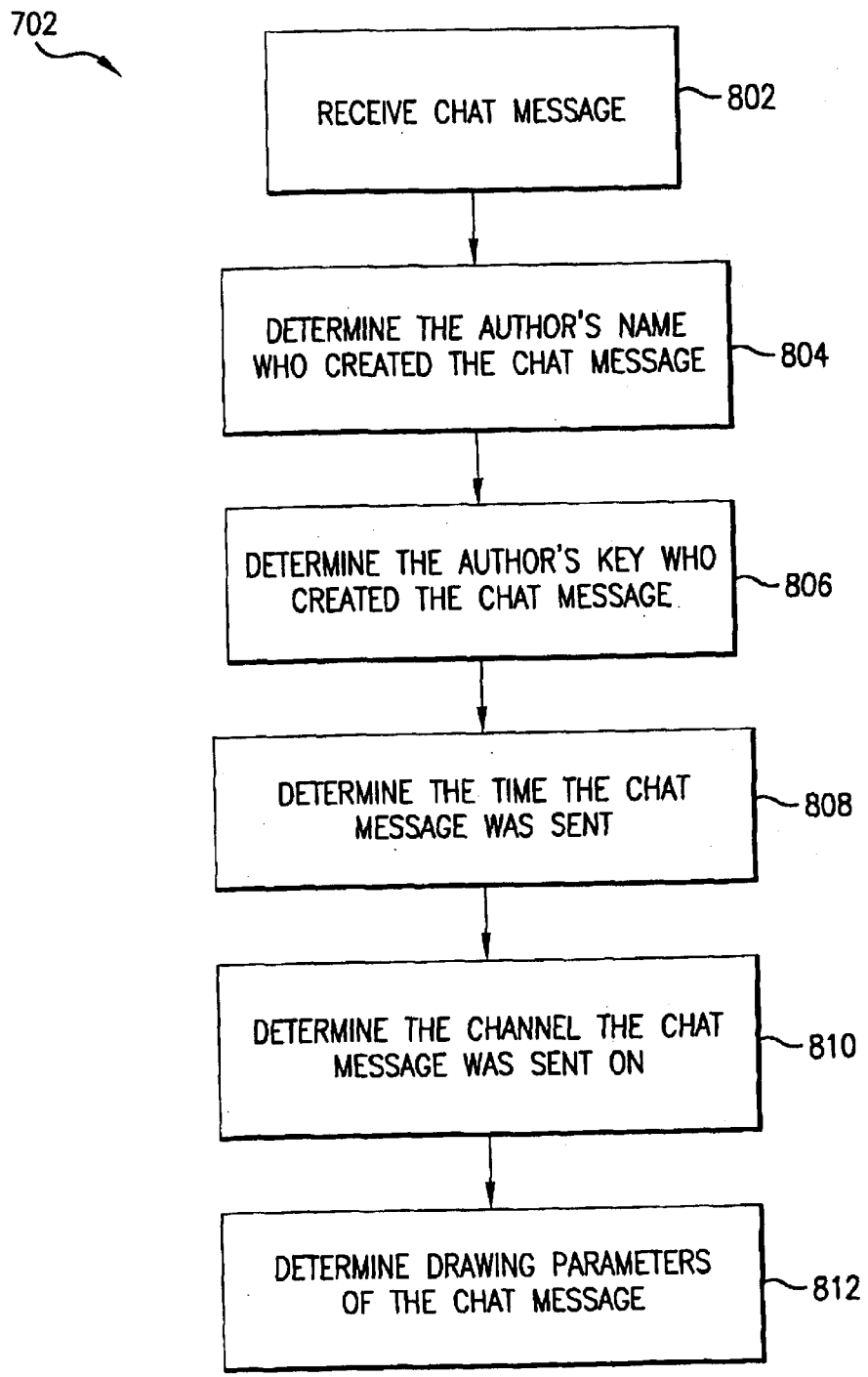
FIG. 8 is a flowchart further describing the step of creating chat wad in the flowchart of FIG. 7 according to an embodiment of the present invention.

FIG. 8 is a flowchart further describing the step of creating chat wad objects 502 in FIG. 7. In FIG. 8, control starts at step 802. In step 802, chat local display 112 receives a new chat message. The new chat message is stored as chat message object 504 in chat wad object 502. Control then passes to step 804.

In step 804, chat local display 112 determines the author's name who created the chat message. Once determined, the author's name is stored in author name object 506 in chat wad object 502. Control then passes to step 806.

In step 806, chat local display 112 determines the author's key (i.e., unique identifier) who created the chat message. Once determined, the author's key is stored in author key object 508 in chat wad object 502. Control then passes to step 808. In step 808, chat local display 112 determines the time the chat message was received. Once determined, the time received is stored in time object 510 in chat wad object 502. Control then passes to step 810.

In step 810, chat local display 112 determines the channel the chat message was sent. Once determined, the channel is stored in channel object 512 in chat wad object 502. Control then passes to step 812.

In step 812, chat local display 112 determines the drawing parameters of the chat message. Once determined, the drawing parameters are stored in drawing parameters object 514 in chat wad object 502. The flowchart in FIG. 8 ends at this point.

Figure 9:
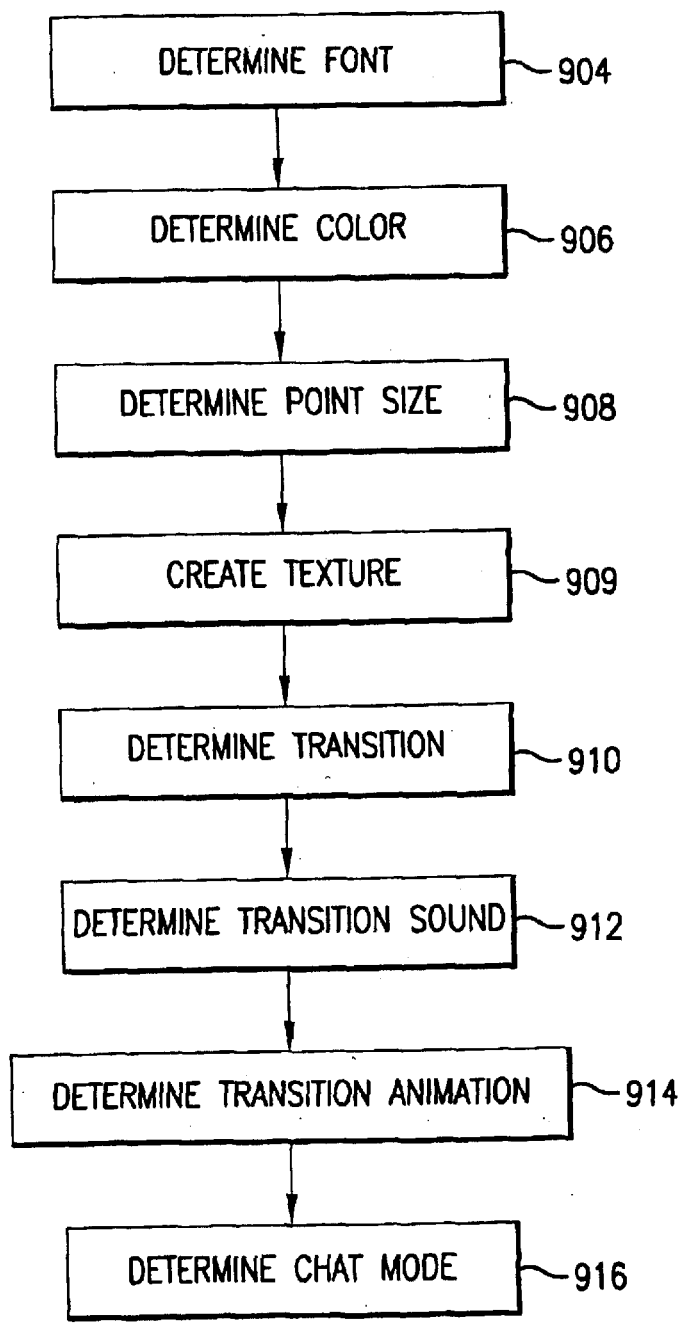
FIG. 9 is a flowchart further describing the step of determining the drawing parameters of the chat message in the flowchart of FIG. 8 according to an embodiment of the present invention.

FIG. 9 is a flowchart further describing the step of determining the drawing parameters of the chat message in FIG. 8. In FIG. 9, control starts at step 904. In step 904, chat local display 112 determines the font in which the chat message is to be displayed. Once determined, the font is stored in font object 604 (FIG. 6) in chat wad object 502. Control then passes to step 906.

In step 906, chat local display 112 determines the color in which the chat message is to be displayed. Once determined, the color is stored in color object 606 in chat wad object 502. Control then passes to step 908.

In step 908, chat local display 112 determines the point size of the font in which the chat message is to be displayed. Once determined, the point size is stored in point size object 608 in chat wad object 502. Control then passes to step 909.

In step 909, chat local display 112 creates the texture in which the chat message is to be displayed. Once created, the texture is stored in texture object 602 in chat wad object 502. Control then passes to step 910.

In step 910, chat local display 112 determines the transition state of the chat message. Once determined, the transition state is stored in transition state object 610 in chat wad object 502. Control then passes to step 912.

In step 912, chat local display 112 determines the transition sound of the chat message. Once determined, the transition sound is stored in transition sound object 612 in chat wad object 502. Control then passes to step 914.

In step 914, chat local display 112 determines the transition animation of the chat message. Once determined, the transition animation is stored in transition animation object 614 in chat wad object 502. Control then passes to step 916.

In step 916, chat local display 112 determines the chat mode of the chat message. Once determined, the chat mode is stored in chat mode object 616 in chat wad object 502. The flowchart in FIG. 9 ends at this point.

Figure 10:
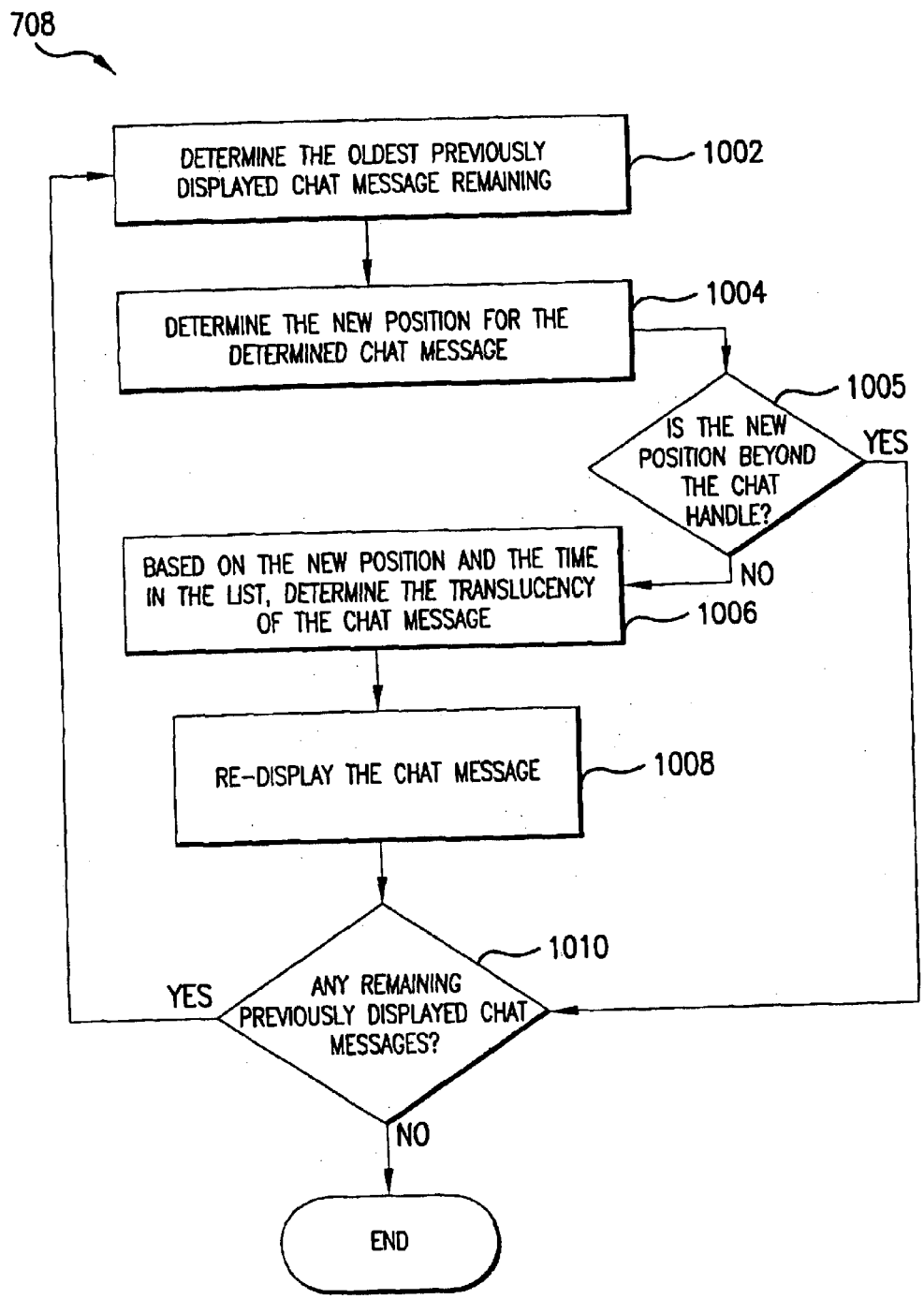
FIG. 10 is a flowchart further describing the step of scrolling up previously displayed chat messages in the flowchart of FIG. 7 according to an embodiment of the present invention.

FIG. 10 is a flowchart further describing the step of scrolling up previously displayed chat messages in FIG. 7. In FIG. 10, control starts at step 1002.

In step 1002, chat local display 112 determines the oldest previously displayed chat message still remaining in local chat area 1107 (FIG. 11). Control then passes to step 1004.

In step 1004, chat local display 112 determines the new position for the oldest previously displayed chat message in step 1002. Control then passes to step 1005.

In step 1005, chat local display 112 determines whether the new position is beyond chat handle 1104 (FIG. 11). Recall that local chat area 1107 ends at chat handle 1104. If the new position is beyond chat handle 1104, then control passes to step 1010. Alternatively, control passes to step 1006.

In step 1006, chat local display 112 determines the translucency of the chat message based on its new position. Recall that the present invention displays a message more translucent as it gets older. Control then passes to step 1008.

In step 1008, chat local display 112 re-displays the chat message in local chat area 1107. Control then passes to step 1010.

In step 1010, chat local display 112 determines if there are more previously displayed chat messages that need to be scrolled up. If the answer is positive, then control passes back to step 1002 and chat local display 112 re-executes steps 1002–1008 for the remaining chat message. Alternatively, the flowchart in FIG. 10 ends.

3D and 2D Chat Message Transitions According to the Present Invention

Figure 15A:
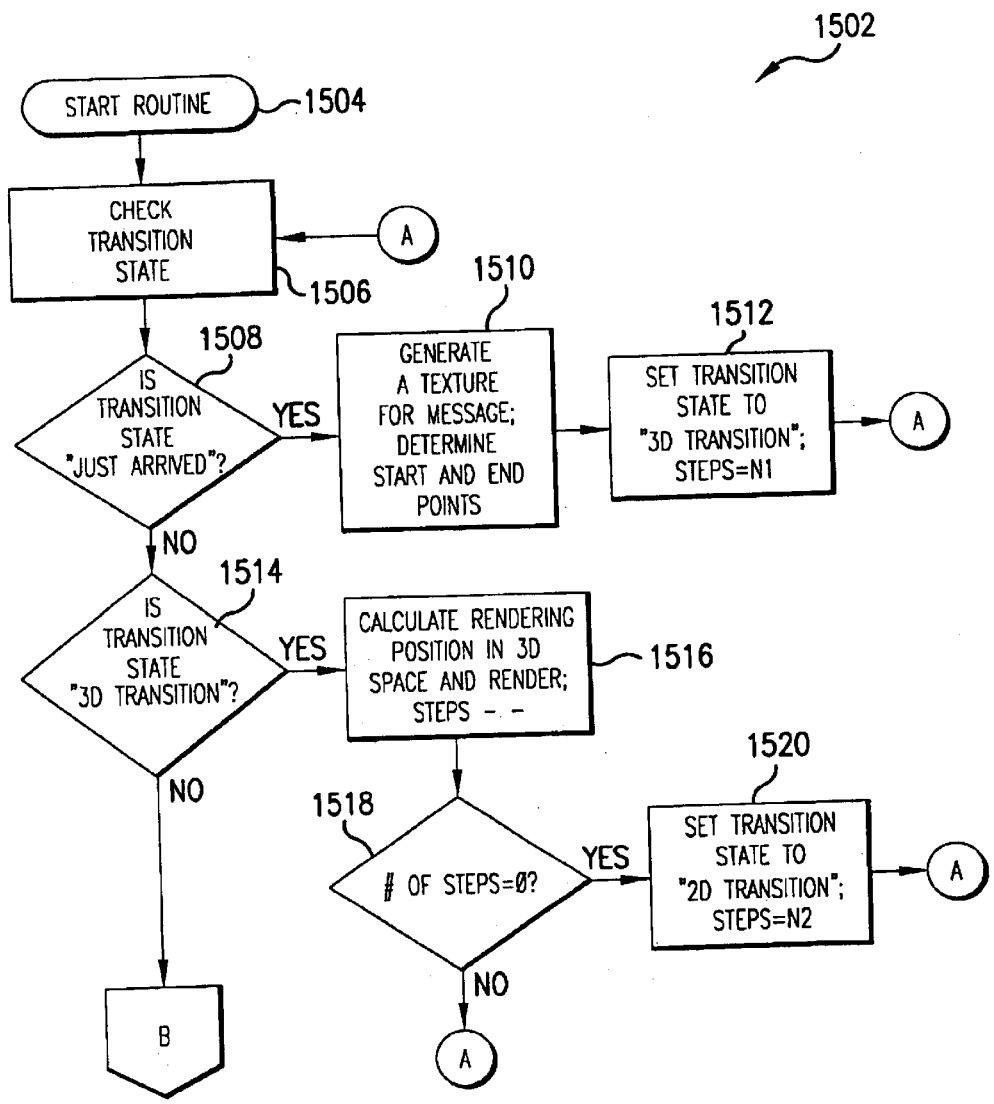
FIGS. 15A–15B is a flowchart showing a method for delivering a chat message in a 3D multi-user environment in accordance with the present
Figure 15B:
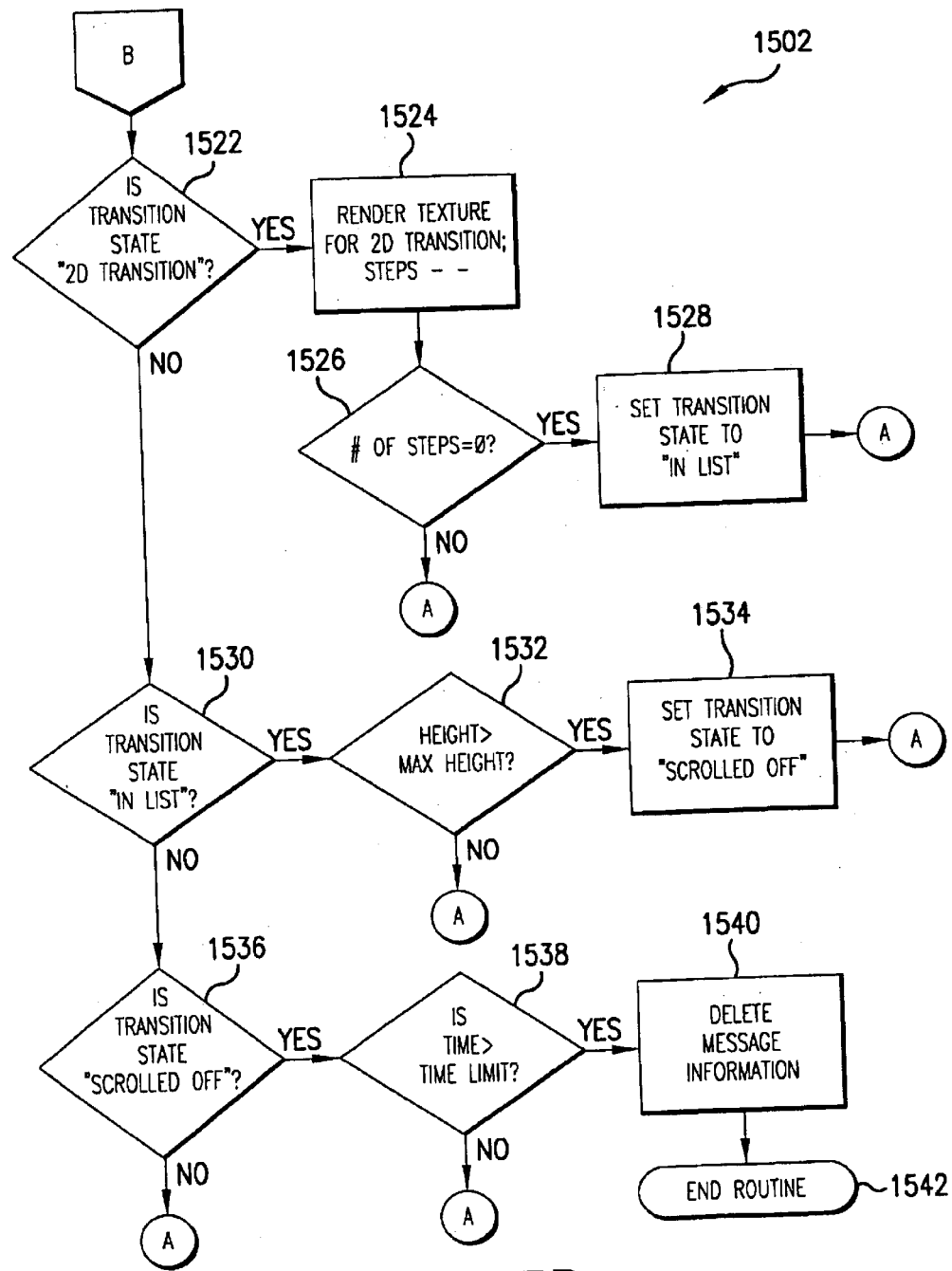

FIGS. 15A–15B depict a flowchart 1502 of a method for delivering a chat message in accordance with the present invention. The invention, however, is not limited to this functional description. Rather, it will be apparent to persons skilled in the art from the teachings herein that other functional flows are within the scope and spirit of the present invention.

The steps of the flowchart 1502 are executed by a recipient interface. As discussed above in regard to FIGS. 1–2, in an embodiment, the recipient interface comprises a GUI 110, a chat local display 112 and a local chat system 108, which itself is further comprised of an Avatar session manager 202, a chat log 204, a chat sender 206 and a local Avatar tracker 212. Accordingly, the steps of flowchart 1502 will be discussed in reference to these elements. However, one skilled in the art will appreciate that the steps of the flowchart 1502 may be executed by a recipient interface comprised of any suitable hardware or software, or combination of both hardware and software for performing the listed steps.

The delivery of the chat message starts at step 1504, after the local chat system 108 has received the chat message 308. The chat local display 112 incorporates the chat message 308 into a chat wad object 502. As discussed above in regard to FIG. 5, the chat wad object 502 includes the chat message 308, author name 506, the author key 508, the time the chat message was sent 510, the channel on which the chat message was sent 512, and the drawing parameters 514. Furthermore, as discussed above in regard to FIG. 6, the drawing parameters 514 further includes the texture 602, the font 604, the color 606, the point size 608, the transition state 610, the transition sound 612, the transition animation 614, and the chat mode 616. However, reference to chat wad object 502 is not limiting and other data structures, including other forms of chat wad objects, can be used as will be appreciated by one skilled in the relevant art.

At step 1506, after the chat local display creates the chat wad object 502, the chat local display 112 checks the transition state 610 of the drawing parameters 514 of the chat wad object 502.

As shown in steps 1508 and 1510, if the transition state 610 is "just arrived," then the chat local display 112 generates a textured message by mapping the chat message 308 to a texture. FIGS. 16A–16F show example textured messages for the chat message "Hi there."

In embodiments, the chat local display 112 uses information in the drawing parameters 514 to generate the textured message. For example, the chat local display 112 can select a texture for the textured message based on the texture 602 parameter in the drawing parameters 514. Similarly, the chat local display 112 can select a font, color or point size for the textured message based on the font 604, color 606 and point size 608 parameters in the drawing parameters 515, respectively.

In an embodiment, the texture 602, font 604, color 606, and point size 608 drawing parameters are each selectable by the sender of the chat message via the sender's GUI, thereby allowing the sender to personally customize his or her textured messages. By customizing his or her textured messages in this manner, the sender can in essence create a recognizable "signature" for the textured message that assists the recipient in identifying its author. In an alternative embodiment, the texture 602, font 604, color 606, and point size 608 drawing parameters can be selected by the sender to indicate the content of the chat message 308. For example, if the chat message 308 is an urgent message, the sender of the chat message can select a bold font with a very large point size to lend a particular emphasis to the textured message.

Alternatively, the texture 602, font 604, color 606, and point size 608 drawing parameters can each be selected by the chat local display 112 itself to indicate the number of intended recipients of the chat message 308. In other words, the texture 602, font 604, color 606 and point size 608 drawing parameters can each be selected by the chat local display 112 as a function of the chat mode 616. For example, if the chat message 308 is directed to only a single recipient (i.e. the chat mode 616 is "whisper"), this may be indicated by generating a textured message with a predetermined texture, font, color or point size that uniquely identifies a whispered chat message.

In another embodiment, the chat local display 112 selects a texture 602 and/or color 606 for the textured message that ensures legibility of the textured message when it is rendered in the 3D world. For example, the chat local display 112 can select a texture 602 for the textured message that appears as an overlay of the original chat message 308 (i.e., the outline of the message is solid, but the message itself is transparent), and a color 606 for the textured message that is different than the color of the portion of the 3D world in which the textured message will be rendered, thereby ensuring that the textured message will be legible to the recipient when it is rendered in 3D space. An example of this is shown in FIG. 19C, where the textured message corresponding to the chat message "Hi there" is rendered using a white overlay against a shaded background. This example is not limiting, and one skilled in the art will appreciate that other textures and/or colors can be selected to ensure legibility of the textured message.

Returning to step 1510 of the flowchart 1502 of FIG. 15, when the transition state 610 is "just arrived," the chat local display 112 also determines a start point and end point for the 3D transition of the textured message in the 3D world. The start point can be any point closer to the digital representation of the sender than to the digital representation of the recipient, and the end point can be any point closer to the digital representation of the recipient than to the digital representation of the sender. In embodiments, the start point is equal to the location of the digital representation of the sender and the end point is equal to the location of the digital representation of the recipient. As discussed above, the location of the digital representation of the sender and recipient is tracked by the local Avatar tracker 212 within the local chat system 108. These locations can be communicated to the chat local display 112 for the purpose of calculating the start and end point of the 3D transition in step 1510.

After the chat local display 112 has determined the start and end points for the 3D transition of the textured message in the 3D world, it changes the transition state 610 from "just arrived" to "3D transition," and sets a counter to the number of rendering steps N1 required to display the 3D transition of the textured message, as shown in step 1512. The chat local display 112 then returns to step 1506 and again checks the transition state 610.

As shown in steps 1514 and 1516, if the transition state 610 is equal to "3D transition," then the chat local display 112 calculates a rendering position in the 3D world at which to render the textured message and renders the textured message at that location. The number of rendering steps N1 is then reduced by one and, at step 1518, if N1 is not equal to zero (i.e., there are more 3D transition rendering steps remaining), then the functional flow loops back through steps 1506, 1508 and 1514 and the rendering of the textured message in the 3D world continues at step 1516 until the number of steps has been reduced to zero.

In embodiments, the rendering position of the textured message is calculated in step 1516 to progress along a path beginning at the start point determined in the earlier step 1510 and terminating at the end point determined in the same earlier step. As viewed through the recipient's 3D viewport, this periodic rendering of the textured message creates the appearance that the textured message is "flying" or traveling through 3D space from the sender's Avatar toward the recipient. This effect not only notifies the recipient that he or she is receiving a chat message, but also indicates to the recipient the location of the digital representation of the sender in 3D space.

The number of steps N1 in the 3D transition and the rate at which the repeated rendering of the textured message occurs in step 1516 determines the frame rate at which the textured message will appeal to be moving toward the recipient's 3D viewport. Generally speaking, the higher the frame rate, the smoother the transition of the textured message as viewed through the recipient's 3D viewport. In embodiments, the frame rate is 30 frames per second or higher, although the invention is not so limited, and the invention can be practiced at frame rates of less than 30 frames per second.

Figure 17A:
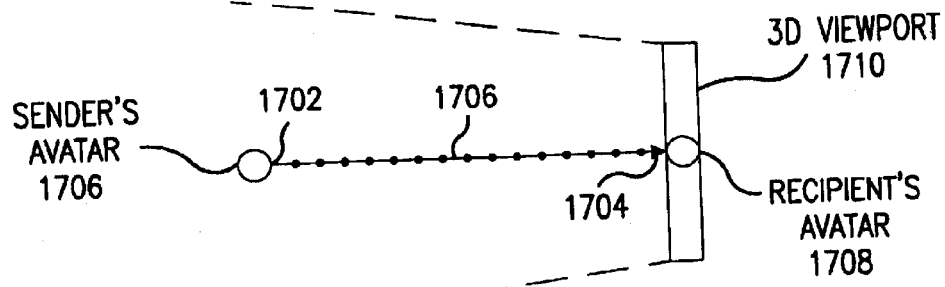
FIGS. 17A, 17B and 17C depict example rendering paths for the 3D transition of a textured message according to embodiments of the invention.

In embodiments, the rendering position progresses along a path between the start point and the end point defined by a vector (i.e., a straight line in 3D space). This is shown, for example, in FIG. 17A, where the start point 1702 is the location of the sender's Avatar 1706, the end point 1704 is the location of the recipient's Avatar 1708, and the line 1706 is the vector connecting them. FIG. 17A is intended to indicate a top-down view of the 3D world. As can be seen in FIG. 17A, the location of the recipient's Avatar 1708 is also the location of the recipient viewport 1710, and the dashed lines emanating from the recipient viewport 1710 indicate the field of view of the recipient viewport 1710 in the 3D world. The end point 1704 is also located on the recipient viewport 1710. The vector 1706 indicates the path along which the textured message is repeatedly rendered in step 1516. In embodiments, rendering positions are calculated by dividing the vector 1706 into N1−1 equal segments between the start point and the end point, where N1 is the number of rendering steps determined in step 1512. The rendering positions progress sequentially from the start point 1702 to the next nearest point between segments, terminating at the end point 1704. As viewed through the recipient viewport 1710, this periodic rendering of the textured message along the vector 1706 creates the appearance that the textured message is traveling along a straight line through 3D space to the recipient viewport 1710 from the sender's Avatar 1702.

Figure 17B:
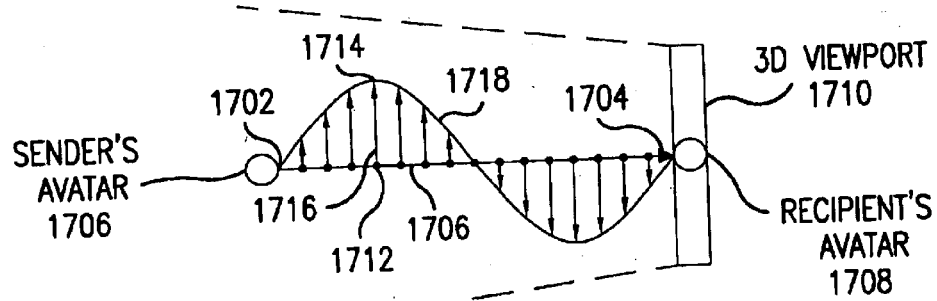
Figure 17C:
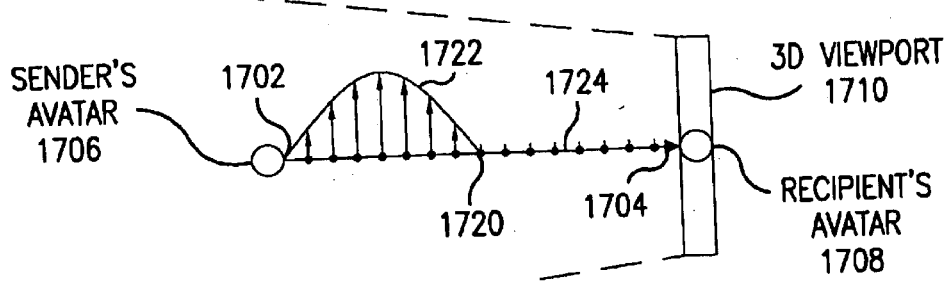

In an alternate embodiment, the rendering position progresses along a path between the start and end points that is defined by a vector as discussed above plus some offset value determined by an offset function. This is depicted, for example, in FIG. 17B, where the start point 1702 and the end point 1704 are the same as in FIG. 17A. Here, however, the path along which the textured message is repeatedly rendered is the curving path 1714. This curving effect is achieved by dividing the vector 1706 into N1−1 segments between the start point 1702 and end point 1704 as discussed above in regard to FIG. 17A. The rendering position is calculated by choosing a point on the vector 1706 beginning with the start point 1702, progressing to the nearest point between segments and terminating at the end point 1704. For each point that is chosen, an offset value is calculated as a function of the distance of the point along vector 1706. This offset value is added to the position of the chosen point to determine the rendering position. For example, in FIG. 17B, during the 3D transition, the point 1712 on the vector 1706 is chosen. An offset value 1716 is calculated as a function of the distance of the point 1712 along the vector 1706, and is added to the location of the point 1712 to calculate the rendering position 1714. The offset value 1716 is represented in FIG. 17B as a line between the point 1712 and the resulting rendering position 1714.

In an embodiment where the start point is the location of the sender's Avatar and the end point is the location of the recipient's Avatar, the offset function discussed above can be selected so that it is always equal to zero at the start point and end point, which ensures that the rendering of the textured message during the 3D transition will always begin at the location of the sender's Avatar and terminate at the recipient's Avatar. This creates a smoother 3D transition from the point of view of the recipient's viewport. For example, the offset function can be a sinusoidal function, where the value of the sinusoidal function is equal to zero at the start point and is also equal to zero at the end point. This is shown, for example, in FIG. 17B, where the resulting offset is the sinusoidal curve 1718 with a zero offset value at the start point 1702 and the end point 1704. This example is not limiting, however, and one skilled in the art will appreciate that any offset function may be utilized that is equal to zero at the start and end points.

In an alternative embodiment, the rendering path is a combination of a vector and a vector plus some offset value, calculated according to the methods discussed above. This is represented, for example, in FIG. 17C, where a portion of the rendering path 1722 is defined by the vector between the start point 1702 and the point 1704 plus some offset value and another portion of the rendering path 1724 is defined by only the vector between the point 1720 and the end point 1704.

In embodiments, the chat local display 112 uses information in the drawing parameters 514 to determine the shape of the rendering path. For example, although it is not shown in FIG. 6, the drawing parameters 514 could include an offset function used by the chat local display 112 to determine the shape of the rendering path as described in regard to FIGS. 17B and 17C above.

In other embodiments, the shape of the rendering path is selectable by the sender of the chat message via the sender's GUI, thereby allowing the sender to personally customize the delivery of his or her textured messages. By customizing his or her textured messages in this manner, the sender can create a recognizable "signature" for the delivery of his or her textured message that assists the recipient in identifying its author. For example, in an embodiment, the sender can select the offset function that will be used by the chat local display 112 to determine the shape of the rendering path as described in regard to FIGS. 17B and 17C above.

In embodiments, the chat local display 112 can account for the possibility that the desired start points and end points may change during the 3D transition of the textured message. This may occur, for example, if the start point is equal to the location of the sender's Avatar and the end point is equal to the location of the recipient's Avatar and the sender's Avatar or the recipient's Avatar moves during the 3D transition of the textured message. In order to account for this possibility, the chat local display 112 can determine a new start and end point as well as recalculate a new rendering path between them before each execution of the rendering step 1516. Because the chat local display 112 keeps track of how many rendering steps have occurred, the chat local display 112 can also then calculate how far along the new path the next rendering position should be. This will ensure that, even though the start and end points may change, the textured message will continue to be rendered progressively along a path between them.

In other embodiments, the chat local display 112 can also account for the possibility that the desired start point may be outside of the field of view of the recipient's 3D viewport. This may occur, for example, if the start point is equal to the location of the digital representation of the sender and the digital representation of the sender is outside the field of view of the recipient's 3D viewport (e.g., the sender's Avatar is behind the field of view of the recipient's 3D viewport). In this situation, the chat local display 112 can render the textured message from the start point to the end point along a curved path that curves outward into the field of vision of the recipient's 3D viewport and back to arrive at the viewport itself. By rendering the textured message along this curved path, the chat local display 112 notifies the recipient that he or she is receiving a chat message, and also indicates to the recipient that the location of the digital representation of the sender is outside of the field of vision of the recipient's 3D viewport.

Also, in embodiments, if the location of the digital representation of the sender is outside and to the left of the center of the recipient's 3D viewport, then the chat local display 112 will render the textured message along a curved path that will appear to emanate from the left-hand side the recipient's 3D viewport. Conversely, if the location of the digital representation of the sender is outside and to the right of the center of the recipient's 3D viewport, then the chat local display 112 will render the textured message along a curved path that will appear to to emanate from the right-hand side of the recipient's 3D viewport. Accordingly, in addition to indicating to the recipient that the location of the digital representation of the sender is outside of the field of vision of the recipient viewport, this will provide the recipient with additional information as to whether the location of the digital representation is to the left or right of the center of the 3D viewport.

Returning now to step 1518 of the flowchart 1502 of FIG. 15, when the number of steps in the 3D transition has reached zero at step 1518, the 3D transition is complete. As a result of the final rendering step 1516, the textured message appears on the bottom of the recipient's viewport, where it remains until it is displaced by other textured messages as will be discussed in more detail below. As shown in step 1520, the chat local display 112 then changes the transition state 610 from "3D transition" to "2D transition" and sets the number of steps N2 for a subsequent 2D transition. The chat local display 112 then returns to step 1506 and again checks the transition state 610.

As shown at steps 1522 and 1524, when the transition state 610 is equal to "2D transition," the chat local display 112 renders a texture to effect a 2D transition and then reduces the number of steps N2 by one. At step 1526, the chat local display 112 checks to see if the number of steps in the 2D transition is equal to zero. If the number of steps is not equal to zero then there are 2D transition frames left to render, and the chat local display 112 loops back through steps 1506, 1508, 1514, and 1522 to render the texture again at step 1524, thereby continuing the 2D transition.

The 2D transition is essentially an animation effect intended to simulate the collision of the textured message from the 3D world with the recipient's viewport. The texture rendered in step 1524 can be any suitable texture for achieving this effect, and can be rendered at any suitable position(s) for achieving this effect. For example, the texture rendered in step 1524 can simulate the appearance of a sheet of water, and can be rendered on a short path leading to the recipient's viewport, thereby generating a "splashing" effect immediately after the textured message has reached the bottom of the recipient's viewport at the end of the 3D transition.

At step 1526, when the number of steps in the 2D transition has reached zero, the 2D transition is complete and the process moves to step 1528. At step 1528, the chat local display 112 changes the transition state 610 from "2D transition" to "in list." The process then returns to step 1506. and the chat local display 112 again checks the transition state 610.

As discussed above, as a result of the final rendering step 1516 in the 3D transition, the textured message appears on the bottom of the recipient's viewport, where it is then maintained as essentially a 2D element. In embodiments, the textured message remains in this position until the recipient receives another message that appears as a textured message on the bottom of the recipient's viewport. When this occurs, the chat local display 112 vertically displaces the original textured message so that it appears above the subsequently received textured message. As each subsequent textured message appears at the bottom of the recipient viewport, the chat local display vertically displaces the original textured message. By vertically displacing older textured messages, the chat local display 112 ensures that textured messages will not overlap on the bottom of the recipient's viewport and also creates a visible chat "history" on the recipient's viewport that permits the recipient to track the thread of a conversation from older textured messages at the top to newer textured messages below.

As shown in steps 1530 and 1532 of FIG. 15, when the transition state 610 is equal to "in list," the chat local display 112 compares the height of the textured message on the recipient's viewport to a maximum height parameter. This maximum height parameter can be a predetermined height parameter fixed by the chat local display 112 or can be selected by the recipient via the GUI 110. If the height of the textured message does not exceed the maximum height parameter, then the chat local display 112 loops back through steps 1506, 1508, 1514, 1522, and 1530 to again compare the height of the textured message to the maximum height parameter at step 1532. This looping will continue until the textured message is vertically displaced to a height on the recipient's viewport that exceeds the maximum height parameter. When this occurs, the chat local display 112 no longer displays the textured message on the recipient viewport and, as depicted in step 1534, the chat local display 112 will change the transition state 610 from "in list" to "scrolled off," and return to checking the transition state 610 at step 1506.

The chat local display retains the information in the chat wad object 502 for a limited period of time after the textured message associated with the chat wad object 502 has been scrolled of the recipient viewport. This time limit can be a predetermined time period fixed by the chat local display 112 or can be selected by the recipient via the GUI 110. In embodiments, the time limit is in the range of 20–30 seconds; however, any time limit may be used. As shown in steps 1536 and 1538, when the transition state 610 is equal to "scrolled off," the chat local display 112 checks to see if the amount of time that has passed since the textured message was scrolled off the recipient's viewport exceeds the time limit. If it does not, then the chat local display 112 loops back through steps 1506, 1508, 1514, 1522, 1530, and 1536 to again compare the time that has passed to the time limit. Once the time that has passed exceeds the time limit, the chat local display 112 deletes the information in the chat wad object 502 and the chat message delivery routine ends.

Figure 18A:
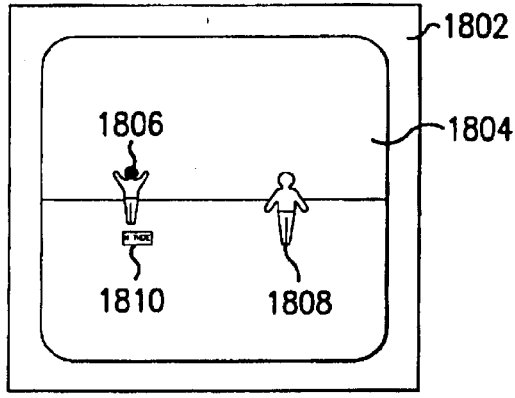
FIGS. 18A, 18B, 18C, 18D, 18E and 18F depict the delivery of a chat message from a sender to a recipient according to an embodiment of the invention.
Figure 18B:
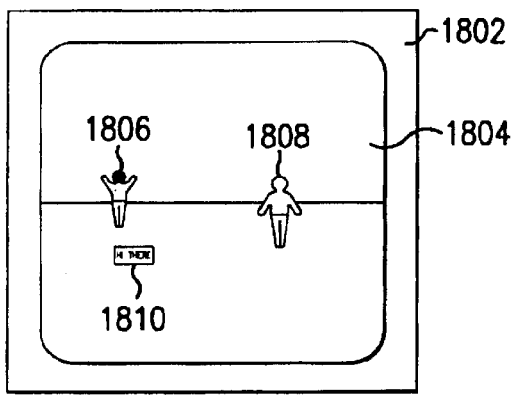
Figure 18C:
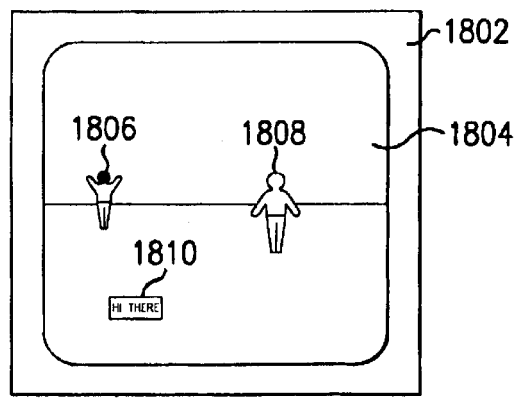
Figure 18D:
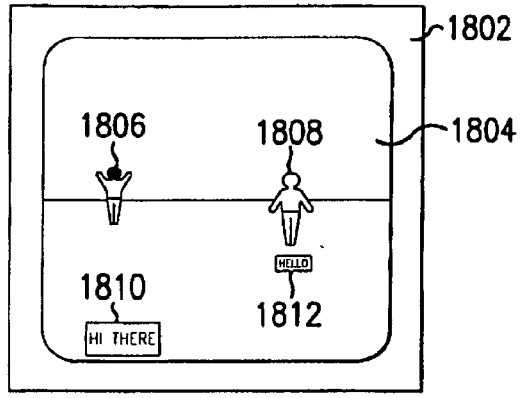
Figure 18E:
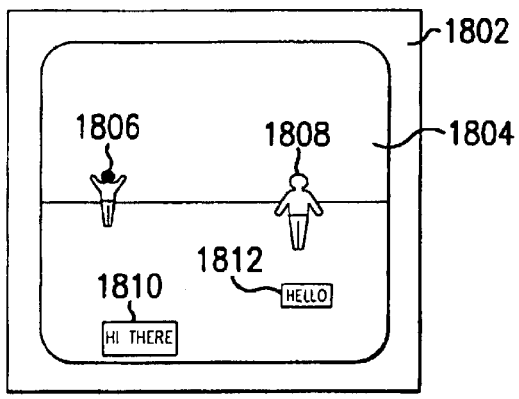
Figure 18F:
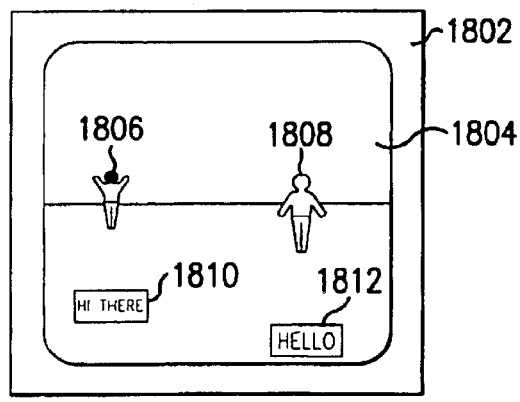

FIGS. 18A–18F depict the delivery of a chat message from a sender to a recipient according to an embodiment of a present invention as viewed from the recipient's 3D viewport. As seen in FIG. 18A, the recipient viewport 1802 provides a view of the 3D world 1804 which includes Avatars 1806 and 1808. The Avatars 1806 and 1808 are the digital representations of users who share the 3D multi-user environment with the recipient.

As discussed above in regard to FIG. 15, in embodiments, when a user sends a chat message to the recipient, the chat local display 112 maps the chat message to a texture to generate a textured message and then periodically renders the textured message in 3D space on a path beginning at the location of the user's Avatar and terminating at the location of the recipient's Avatar, which coincides with the location of the recipient's viewport. This 3D transition is shown in FIGS. 18A–18D, where the textured message 1810 corresponding to the chat message "Hi there" is periodically rendered in the 3D world 1804 starting at the location of the Avatar 1806 and terminating at the location of the recipient's Avatar, creating the effect that the textured message 1810 is traveling through the 3D world 1804 to land at the bottom of the recipient viewport 1802. As noted above, this effect not only notifies the recipient that he or she is receiving a chat message, but also indicates to the recipient the location of the digital representation of the sender 1806 in the 3D world 1804.

As also discussed in regard to FIG. 15 above, in embodiments, textured messages are maintained as 2D elements at the bottom of the recipient's viewport after the 3D transition until another textured message is received. When this occurs, the chat local display 112 vertically displaces the original textured message so that it appears above the subsequently received textured message. This is shown, for example, in FIGS. 18D–18F, where the textured message 1812 corresponding to the chat message "Hello" is periodically rendered in the 3D world 1804 starting at the location of the Avatar 1808 and terminating at the location of the recipient's Avatar to land at the bottom of the recipient viewport 1802. When the textured message 1812 arrives at the bottom of the recipient viewport 1802, the chat local display 112 vertically displaces the textured message 1810. By vertically displacing the textured message 1810, the chat local display 112 ensures that the textured messages 1810 and 1812 do not overlap. This displacement also serves to create a visible chat "history" on recipient viewport 1802 that permits the recipient to track the thread of a conversation from older textured messages at the top to newer textured messages below.

In embodiments, the chat local display 112 renders a textured message gradually more translucent each time that it is vertically displaced on the recipient's viewport, so that older textured messages will not obstruct the recipient's view of the 3D world through the viewport. In further embodiments. the chat local display 112 causes textured messages to "fade" from the recipient's viewport as the time on which they appear on the recipient's viewport approaches a predetermined time limit.

Figure 19A:
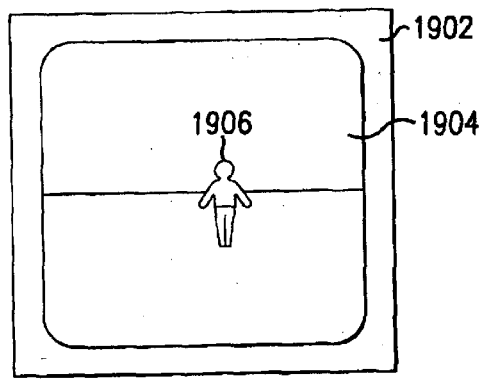
FIGS. 19A, 19B, 19C, 19D, 19E and 19F depict the delivery of a chat message from a sender to a recipient according to an embodiment of the invention.
Figure 19D:
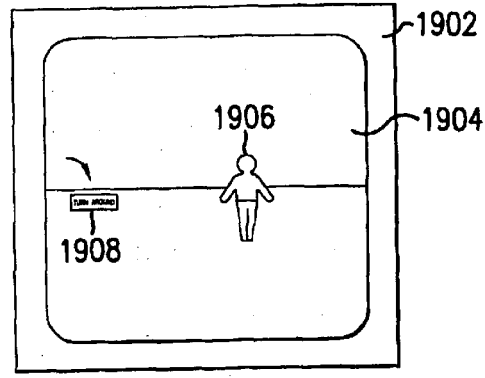
Figure 19B:
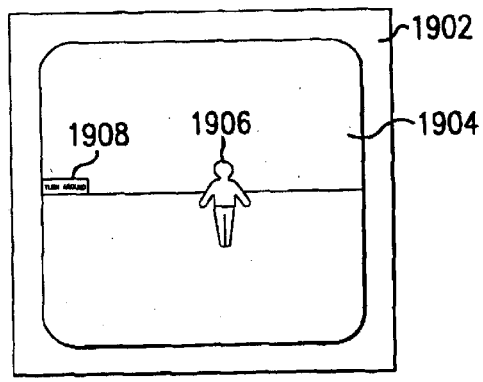
Figure 19E:
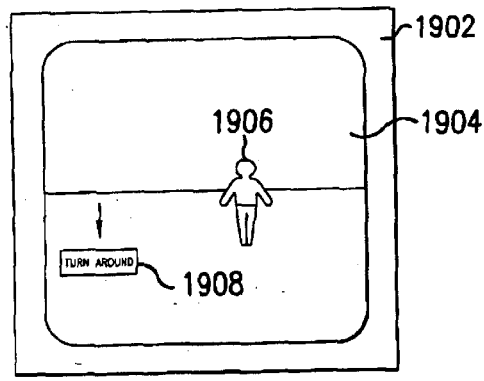
Figure 19C:
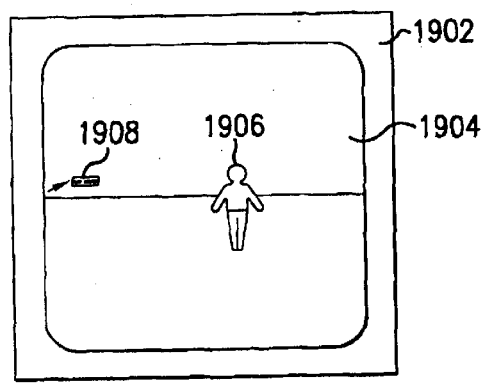
Figure 19F:
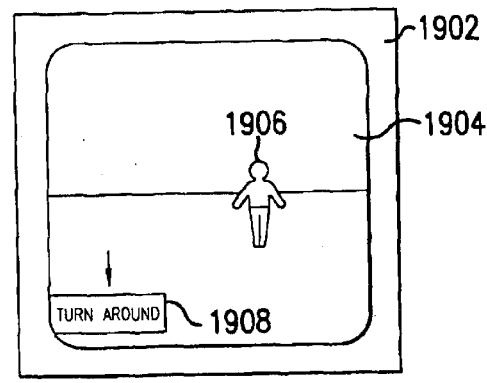

FIGS. 19A–19F depicts the delivery of a chat message from a sender to a recipient according to an embodiment of a present invention as viewed from the recipient's 3D viewport, where the digital representation of the sender is outside the field of view of the recipient's 3D viewport. As seen in FIG. 19A, the recipient viewport 1902 provides a view of the 3D world 1904 which includes the Avatar 1906. The Avatar 1906 is the digital representation of a user who shares the 3D multi-user environment with the recipient. Not shown in FIG. 19A but described below is another Avatar that is located outside the field of view of the recipient viewport 1902.

As discussed above in regard to FIG. 15, in embodiments where the start point for the 3D transition is the sender's Avatar, and the sender's Avatar is outside the field of vision of the recipient's 3D viewport, the chat local display 112 canl render the textured message from the start point to the end point along a curved path that curves outward into the field of vision of the recipient's 3D viewport and back to arrive at the viewport itself. By rendering the textured message along this curved path, the chat local display 112 notifies the recipient that he or she is receiving a chat message, and also indicates to the recipient that the location of the sender's Avatar is currently outside of the field of vision of the recipient's 3D viewport. This is shown, for example, in FIGS. 19A–19F, where the textured message 1908 corresponding to the chat message "Turn around!" is periodically rendered in the 3D world 1904 starting at a location outside of the recipient viewport 1902 in FIG. 19A, curving outward into the field of vision of the recipient viewport 1902 in FIGS. 19B–19C, and curving back to arrive at the recipient viewport 1902 in FIGS. 19D–19F. The arrows on the figures indicate the direction of motion of the textured message, and do not appear on the viewport. This rendering method not only notifies the recipient that he or she is receiving a chat message, but also indicates to the recipient that the location of the digital representation of the sender of the textured message 1908 is outside the field of view of the recipient viewport 1902.

As also discussed above, in embodiments, if the location of the digital representation of the sender is outside and to the left of the center of the recipient's 3D viewport, then the chat local displays 112 will render the textured message along a curved path that will appear to emanate from the left hand side the recipient's 3D viewport. Conversely, if the location of the digital representation of the sender is outside and to the right of the center of the recipient's 3D viewport, then the chat local display 112 will render the textured message along a curved path that will appear to emanate from the right hand side of the recipient's 3D viewport. In FIGS. 19A–19F, the textured message is rendered along a curved path that appears to emanate from the left side of the recipient viewport 1902, thereby indicating to the recipient that the location of the digital representation of the sender is outside and to the left of center of the recipient viewport 1902.

Figure 20A:
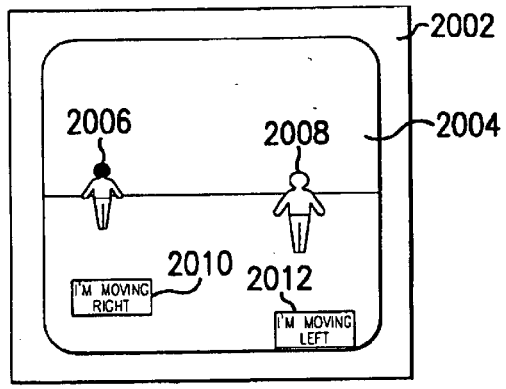
FIGS. 20A, 20B, 20C, 20D, 20E and 20F show the management of textured messages as two-dimensional elements on a recipient viewport in an embodiment of the invention.
Figure 20D:
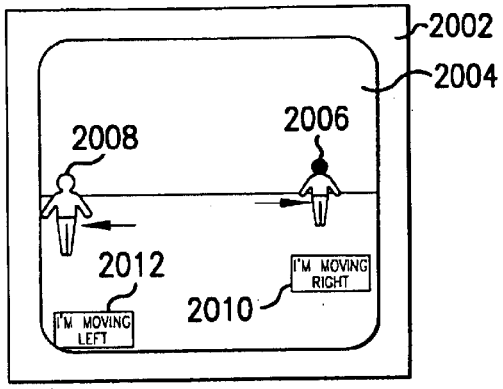
Figure 20B:
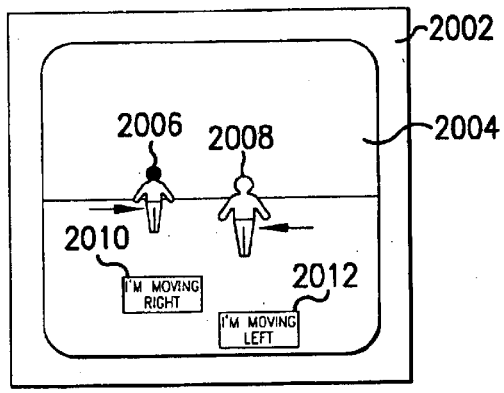

FIGS. 20A–20F show how textured messages are managed as two-dimensional elements on the recipient's 3D viewport in embodiments of the invention. As seen in FIG. 20A, the recipient viewport 2002 provides a view of the 3D world 2004 which includes the Avatars 2006 and 2008. The Avatar 2006 has sent a chat message to the recipient which now appears as part of a textured message 2010 on the recipient viewport 2002. Similarly, the Avatar 2008 has sent a chat message to the recipient which now appears as part of a textured message 2012 on the recipient viewport 2002.

In addition to the functions outlined above, the chat local display 112 is responsible for managing the textured messages as two-dimensional elements on the recipient's 3D viewport after the 3D and 2D transitions have occurred but before the textured messages are scrolled off. In embodiments, the chat local display 112 displays the textured messages as 2D elements that are in horizontal alignment with the appearance of the digital representation of the sender when the digital representation of the sender is in the field of vision of the recipient's 3D viewport. This is demonstrated, for example in FIGS. 20A–20E where the textured message 2010 which reads "I'm moving right" is displayed in horizontal alignment with the Avatar 2006 representing the sender of that message, even as the Avatar 2006 moves right across the recipient viewport 2002. Similary, FIGS. 20A–20D show that the textured message 2012 which reads "I'm moving left" is displayed in horizontal alignment with the Avatar 2008 representing the sender of that message, even as the Avatar 2008 moves right across the recipient viewport 2002. By displaying the textured messages in this fashion, the chat local display 112 assists the recipient in locating the digital representation of the sender of a given chat message.

Figure 20E:
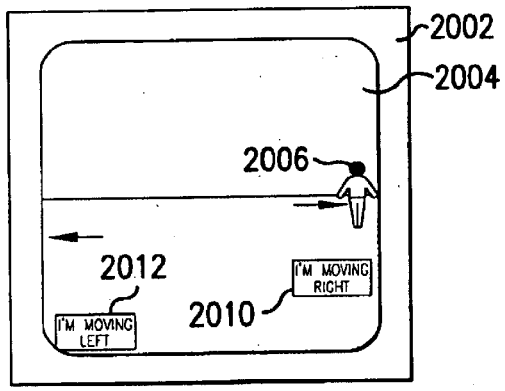
Figure 20C:
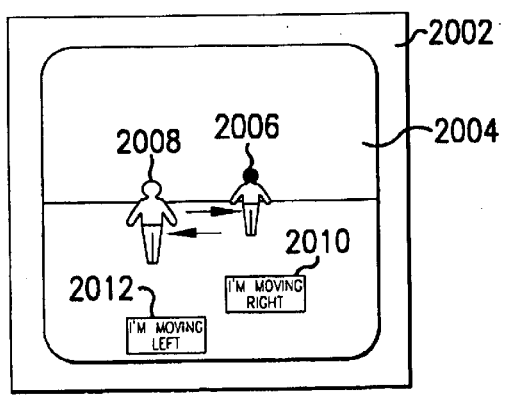
Figure 20F:
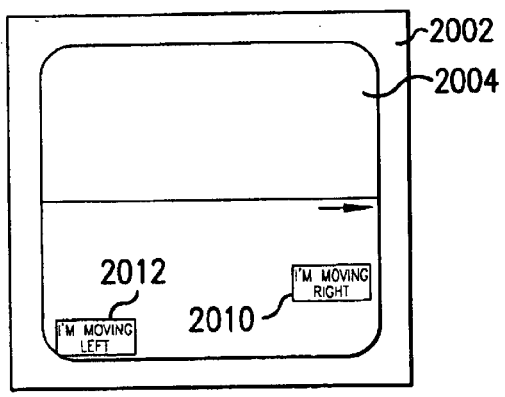
Figure 21A:
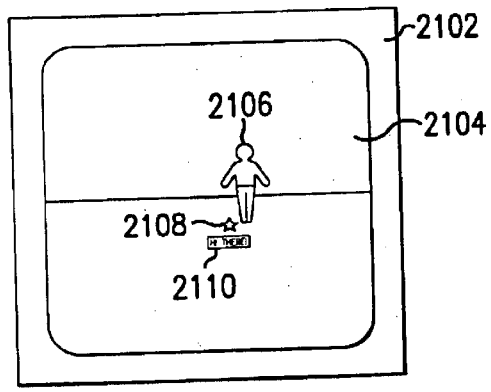
FIGS. 21A, 21B, 21C, 21D, 21E, and 21F depict the delivery of a chat message with an additional animation component according to an embodiment of the invention.
Figure 21D:
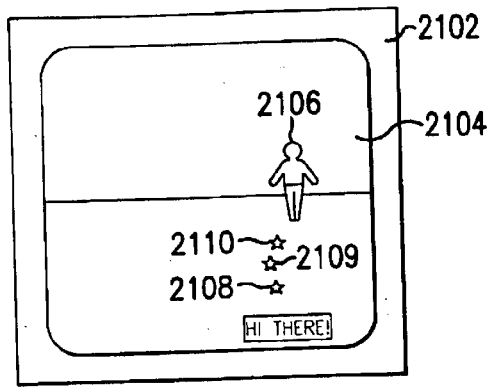
Figure 21B:
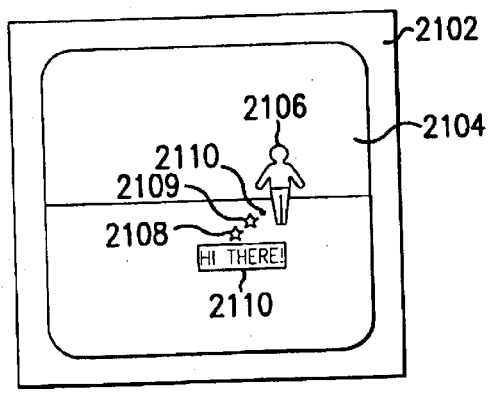
Figure 21E:
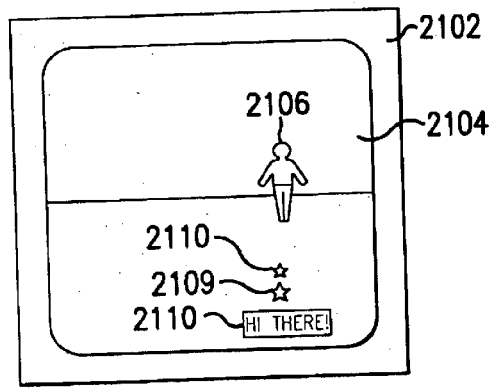
Figure 21C:
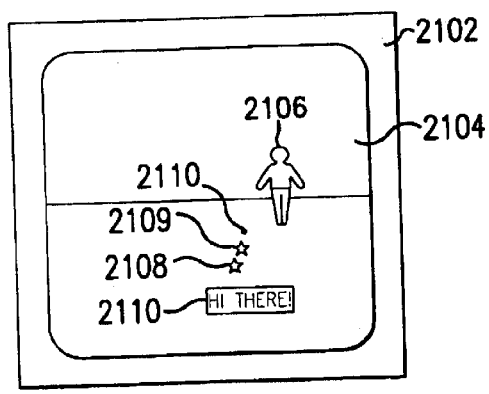
Figure 21F:
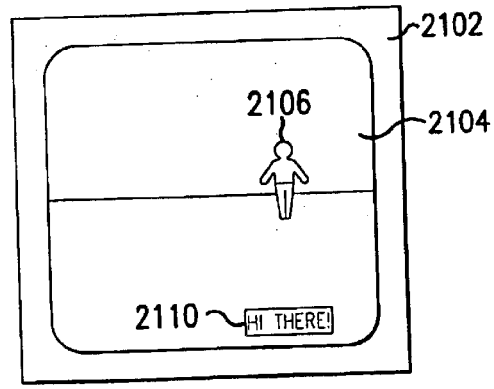

In embodiments, when the digital representation of the sender moves out of the field of view of the recipient's 3D viewport, the chat local display displays the textured message flush right on the recipient's 3D viewport when the digital representation of the sender is to the right of the field of view of the viewport and flush left on the recipient's 3D viewport when the digital representation of the sender is to the left of the field of view of the recipient viewport. This is shown, for example, in FIGS. 20D–20F, where the textured message 2012 which reads "I'm moving left" is displayed flush left on the recipient viewport 2002 after the Avatar 2008 representing the sender of that message has moved left out of the field of view of the recipient viewpoint 2002. This is also shown in FIGS. 20E–20F, where the textured message 2010 which reads "I'm moving right" is displayed flush right on the recipient viewport 2002 after the Avatar 2006 representing the sender of that message has moved right out of the field of view of the recipient viewport 2002. The displaying of the textured messages in this manner provides a cue to the recipient that assists in locating the digital representation of the sender of a given chat message.

FIGS. 20A–20F also demonstrate that because the chat local display 112 vertically displaces the older textured message 2010 on the recipient viewport 2002 to accommodate the newer textured message 2012, the textured messages 2010 and 2012 will not overlap even when the chat local display moves them horizontally on the recipient viewport 2002. The management of the textured messages on the recipient viewport in this manner ensures the legibility of the textured messages.

In embodiments of the invention, the 3D transition of a textured message can be accompanied by an additional animation component. For example, in an embodiment of the inventions the local chat display 112 can render one or more additional animation textures in the 3D world adjacent to and preferably slightly behind the textured message along the same path upon which the textured message is rendered. The rendering of these additional animation textures creates a "trail" for the textured message that further assists the recipient in identifying the location of the digital representation of the sender.

FIGS. 21A–21F show an example embodiment in which the 3D transition of a textured message is accompanied by an additional animation component. As shown in FIGS. 20A–20F, the recipient viewport 2102 provides a view of the 3D world 2104 which includes an Avatar 2106, a textured message 2110 from a sender represented by the Avatar 2106, and additional animation textures 2108, 2109 and 2110. The additional animation textures 2108, 2109 and 2110 are rendered by the local chat display 112 in the 3D world 2104 adjacent to and slightly behind the textured message 2110 as it is rendered along a path from the sender's Avatar 2106 to the recipient's viewport 2102. Because the additional animation textures 2108, 2109 and 2110 are rendered behind the textured message 2110 and along the same path as the textured message 2110, they, in effect, generate a "trail" of stars behind the textured message 2110 during the 3D transition. This trail can assist the recipient in identifying the location of the Avatar representing the sender of the textured message 2110.

In embodiments, the chat local display 112 uses the transition animation parameter 614 from the drawing parameters 514 in chat wad object 502 to generate the additional animation textures. For example, the transition animation 614 parameter can identify one of a set number of additional animation textures that should accompany the rendering of the textured message during the 3D transition.

In an embodiment, the transition animation parameter 614 can be selected by the sender of the chat message via the sender's GUI, thereby allowing the sender to personally customize the additional animation texture accompanying his or her textured messages. By customizing the additional animation texture in this manner, the sender, in essence, can create a recognizable "signature" for the textured message that will assist the recipient in identifying its author. In an alternative embodiment, the transition animation parameter 614 can be selected by the sender to indicate the content of the chat message 308. For example, if the chat message 308 is a love note, the sender of the chat message 308 can select an additional animation texture comprised of one or more hearts, an example of which is shown in FIG. 16G, or one or more kisses, an example of which is shown in FIG. 16H, which will be rendered trailing behind the textured message during the 3D transition as discussed above. Or, for example, if the chat message 308 is a question, the sender of the chat message 308 can choose an additional animation texture of one or more question marks, an example of which is shown in FIG. 161, which will be rendered trailing behind the textured message during the 3D transition.

Alternatively, the transition animation parameter 614 can be selected by the chat local display 112 itself to indicate the number of intended recipients of the chat message 308. In other words, the transition animation parameter 614 can be selected by the chat local display 112 as a function of the chat mode 616. For example, if the chat message 308 is directed to only a single recipient (i.e. the chat mode 616 is "whisper"), this may be indicated by rendering the textured message followed by an accompanying animation texture that uniquely identifies a whispered chat message.

In embodiments of the invention, the 3D transition of a textured message may also be accompanied by an additional audio component. For example, in an embodiment of the invention, the local chat display 112 can obtain a sound effect and play the sound effect contemporaneously with the rendering of the textured message during the 3D transition.

In an embodiment, the local chat display 112 can play the sound effect using well known 3D audio techniques that will create the impression that the sound effect originates from the location of the sender's Avatar in the 3D world. For example, if the sender's Avatar is to the front and left of the recipient's viewport, then the local chat display 112 will play the sound effect using 3D audio techniques to create the impression that the sound originates from the front and to the left of the recipient.

In embodiments, the chat local display 112 uses the transition sound parameter 612 from the drawing parameters 514 in chat wad object 502 to obtain the sound effect. For example, the transition sound parameter 612 can identify one of a set number of sound effects that can be played contemporaneously with the rendering of the textured message during the 3D transition.

In an embodiment, the transition sound parameter 612 can be selected by the sender of the chat message via the sender's GUI, thereby allowing the sender to personally customize the sound effect accompanying his or her textured messages. By customizing the sound in this manner, the sender, in essence, can create a recognizable "signature" for the textured message that will assist the recipient in identifying its author. In an alternative embodiment, the transition sound parameter 612 can be selected by the sender to indicate the content of the chat message 308. For example, if the chat message 308 is a message of congratulations, the sender of the chat message 308 can select the sound effect of applause that will be played contemporaneously with the rendering of the textured message during the 3D transition.

Alternatively, the transition sound parameter 612 can be selected by the chat local display 112 itself to indicate the number of intended recipients of the chat message 308. In other words, the transition sound parameter 612 can be selected by the chat local display 112 as a function of the chat mode 616. For example, if the chat message 308 is directed to only a single recipient (i.e. the chat mode 616 is "whisper"), this may be indicated by playing a sound effect that uniquely identifies a whispered chat message contemporaneously with rendering if the textured message during the 3D transition.

Although the invention has been particularly shown and described with reference to several preferred embodiments thereof, it will be understood by those skilled in the art that various changes in form and details may be made therein without departing from the spirit and scope of the invention as defined in the appended claims.

J. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for delivering a message between a sender and a recipient in a three-dimensional multi-user environment, wherein said three-dimensional multi-user environment maintains respective digital representations of the sender and the recipient, comprising:
   a sender interface; and
   a recipient interface, including a recipient viewport;
   wherein said recipient interface receives the message from said sender interface, maps the message to a texture to generate a textured message, and renders said textured message at locations along a path in the three-dimensional multi-user environment, whereby the recipient can visually ascertain at least portions of the path of the textured message through said recipient viewport.

2. The system of claim 1, wherein said sender and recipient interfaces comprise software modules and the message is sent from said sender interface to said recipient interface over the Internet.

3. The system of claim 1, wherein said recipient interface receives appearance information and uses said appearance information to generate said textured message.

4. The system of claim 3, wherein said appearance information is sent from said sender interface to said recipient interface.

5. The system of claim 3, wherein said appearance information is indicative of the identity of the sender.

6. The system of claim 3, wherein said appearance information includes color information.

7. The system of claim 3, wherein said appearance information includes font information.

8. The system of claim 3, wherein said appearance information includes point size information.

9. The system of claim 3, wherein said appearance information is indicative of the content of the message.

10. The system of claim 3, wherein said appearance information is indicative of the number of recipients of the message.

11. The system of claim 1, wherein said recipient interface generates a textured message that is a different color than the colors used to define the three-dimensional multi-user environment along the path of the textured message, thereby ensuring the legibility of the textured message.

12. The system of claim 1, wherein said recipient interface obtains a sound associated with said textured message, and plays said sound contemporaneously with the rendering of said textured message in the three-dimensional multi-user environment.

13. The system of claim 12, wherein said recipient interface receives audio information and uses said audio information to obtain said sound associated with the textured message.

14. The system of claim 13, wherein said audio information is sent from said sender interface to said recipient interface.

15. The system of claim 13, wherein said audio information is indicative of the identity of the sender.

16. The system of claim 12, wherein said sound associated with said textured message is indicative of the content of the message.

17. The system of claim 12, wherein said sound associated with said textured message is indicative of the number of recipients of the message.

18. The system of claim 12, wherein said sound associated with said textured message is indicative of the location of the digital representation of the sender in the three-dimensional multi-user environment.

19. The system of claim 1, wherein said recipient interface generates an animation texture associated with said textured message, and renders said animation texture at locations along a path in the three-dimensional multi-user environment, whereby the recipient can visually ascertain at least portions of the path of the animation texture through said recipient viewport.

20. The system of claim 19, wherein said recipient interface receives appearance information and uses said appearance information to generate said animation texture.

21. The system of claim 20, wherein said appearance information is sent from said sender interface to said recipient interface.

22. The system of claim 20, wherein said appearance information is indicative of the identity of the sender.

23. The system of claim 20, wherein said appearance information is indicative of the content of the message.

24. The system of claim 1, wherein said recipient interface displays said textured message as a two-dimensional clement on said recipient viewport after rendering said textured message in the three-dimensional multi-user environment.

25. The system of claim 24, wherein said recipient interface displays said two-dimensional element on said recipient viewport for a predetermined time period.

26. The system of claim 24, wherein said recipient interface displays said textured message as a two-dimensional element on the bottom of said recipient viewport, and vertically displaces said two-dimensional element to accomodate other textured messages at the bottom of said recipient viewport.

27. The system of claim 24, wherein said recipient interface displays said two-dimensional element in horizontal alignment w with the appearance of the digital representation of the sender in said recipient viewport.

28. The system of claim 24, wherein said recipient interface displays said two-dimensional element flush right on said recipient viewport when the digital representation of the sender is to the right of the scope of said recipient viewport and flush left on said recipient viewport when the digital representation of the sender is to the left of the scope of said recipient viewport.

29. A system for delivering a message between a sender and a recipient in a three-dimensional multi-user environment, wherein said three-dimensional multi-user environment maintains respective digital representations of the sender and the recipient, comprising:

a sender interface;

a recipient interface, including a recipient viewport;

wherein said recipient interface receives the message from said sender interface, maps the message to a texture to generate a textured message, selects a first location in the three-dimensional multi-user environment closer to the digital representation of the sender than to the digital representation of the recipient, selects a second location in the three-dimensional multi-user environment closer to the digital representation of the recipient than to the digital representation of the sender, and periodically renders said textured message in the three-dimensional multi-user environment along a path beginning at said first location and ending at said second location, so as to permit the recipient to visually ascertain the location of the digital representation of the sender through said recipient viewport.

30. The system of claim 29, wherein said recipient interface displays said textured message as a two-dimensional element on said recipient viewport after rendering said textured message at said second location in the three-dimensional multi-user environment.

31. The system of claim 29, wherein said recipient interface receives path information and uses said path information to define the shape of said path between said first location and said second location.

32. The system of claim 31, wherein said path information is sent from said sender interface to said recipient interface.

33. The system of claim 31, wherein said path information is indicative of the identity of the sender.

34. A system for delivering a message between a sender and a recipient in a three-dimensional multi-user environment, wherein said three-dimensional multi-user environment maintains respective digital representations of the sender and the recipient, comprising:

a sender interface;

a recipient interface, including a recipient viewport;

wherein said recipient interface receives the message from said sender interface, maps the message to a texture to generate a textured message, periodically determines the location of the digital representation of the sender and the location of the digital representation of the recipient, and periodically renders said textured message in the three-dimensional multi-user environment along a path between said location of the digital representation of the sender and said location of the digital representation of the recipient, so as to permit the recipient to visually ascertain said location of the digital representation of the sender through the recipient viewport.

35. The system of claim 34, wherein said recipient interface displays said textured message as a two-dimensional element on the recipient viewport after periodically rendering said textured message along a path between said location of the digital representation of the sender and said location of the digital representation of the recipient.

36. The system of claim 34 wherein said recipient interface receives path information, and uses said path information to define the shape of said path between said location of the digital representation of the sender and said location of the digital representation of the recipient.

37. The system of claim 36 wherein said path information is sent from said sender interface to said recipient interface.

38. The system of claim 36, wherein said path information is indicative of the identity of the sender.

39. A chat system for delivering a message between a sender and a recipient in a three-dimensional multi-user environment, wherein said three-dimensional multi-user environment maintains respective digital representations of the sender and the recipient, comprising:

a recipient interface;

wherein said recipient interface receives a message, maps the message to a texture to generate a textured message, and renders said textured message in the three-dimensional multi-user environment so as to permit the recipient to visually ascertain the location of the digital representation of the sender.

40. The chat system of claim 39, wherein said recipient interface renders said textured message in the three-dimensional multi-user environment closer to the digital representation of the sender than to the digital representation of the recipient, and subsequently renders said textured message in the three-dimensional multi-user environment closer to the digital representation of the recipient than to the digital representation of the sender.

41. The chat system of claim 40, wherein said recipient interface comprises a software module and the message is sent to said recipient interface over the Internet.

42. A method for receiving a message sent from a sender to a recipient in a three-dimensional multi-user environment wherein the recipient has a viewport into the three-dimensional multi-user environment and the sender and recipient are each digitally represented therein, comprising the steps of:

receiving the message;

mapping the message to a texture to generate a textured message; and rendering said textured message at locations along a path in the three-dimensional multi-user environment, whereby the recipient can visually ascertain at least portions of the path of said textured message through the recipient viewport.

43. The method of claim 42, wherein the message is sent from the sender to the recipient over the Internet.

44. The method of claim 42, further comprising the steps of receiving appearance information, and using said appearance information to generate said textured message.

45. The method of claim 42, further comprising the steps of receiving appearance information from the sender, and using said appearance information to generate said textured message.

46. The method of claim 42, further comprising the steps of receiving appearance information indicative of the identity of the sender, and using said appearance information to generate said textured message.

47. The method of claim 42, further comprising the steps of receiving appearance information that includes color information, and using said appearance information to generate said textured message.

48. The method of claim 42, further comprising the steps of receiving appearance information that includes font information, and using said appearance information to generate said textured message.

49. The method of claim 42 further comprising the steps of receiving appearance information that includes point size information, and using said appearance information to obtain said textured message.

50. The method of claim 42, further comprising the steps of receiving appearance information indicative of the content of the message, and using said appearance information to generate said textured message.

51. The method of claim 42, further comprising the steps of receiving appearance information indicative of the number of recipients of the message, and using said appearance information to generate said textured message.

52. The method of claim 42, wherein said step of mapping the message to a texture to generate a textured message further comprises generating a textured message that is a different color than the colors used to define the three-dimensional multi-user environment along the path of said textured message, thereby ensuring the legibility of the textured message.

53. The method of claim 42, further comprising the steps of:

obtaining a sound associated with said textured message; and playing said sound contemporaneously with the rendering of said textured message in the three-dimensional multi-user environment.

54. The method of claim 53, further comprising the steps of receiving audio information and using said audio information to obtain said sound associated with said textured message.

55. The method of claim 53, further comprising the steps of receiving audio information from the sender and using said audio information to obtain said sound associated with said textured message.

56. The method of claim 42, further comprising the steps of:

obtaining a sound associated with said textured message; and playing said sound contemporaneously with the rendering of said textured message in the three-dimensional multi-user environment;

wherein said sound is indicative of the identity of the sender.

57. The method of claim 42, further comprising the steps of:

obtaining a sound associated with said textured message; and playing said sound contemporaneously with the rendering of said textured message in the three-dimensional multi-user environment;

wherein said sound is indicative of the content of the message.

58. The method of claim 42, further comprising the steps of:

obtaining a sound associated with said textured message; and playing said sound contemporaneously with the rendering of said textured message in the three-dimensional multi-user environment;

wherein said sound is indicative of the number of recipients of the message.

59. The method of claim 42, further comprising the steps of:

obtaining a sound associated with said textured message; and playing said sound contemporaneously with the rendering of said textured message in the three-dimensional multi-user environment;

wherein said sound associated with said textured message is indicative of the location of the digital representation of the sender in the three-dimensional multi-user environment.

60. The method of claim 42, further comprising the steps of:

generating an animation texture associated with said textured message; and rendering said animation texture at locations along a path in the three-dimensional multi-user environment, whereby the recipient can visually ascertain at least portions of the path of said animation texture through the recipient viewport.

61. The method of claim 60, further comprising the steps of:
receiving appearance information; and
using said appearance information to generate said animation texture.

62. The method of claim 60, further comprising the steps of:
receiving appearance information from the sender; and
using said appearance information to generate said animation texture.

63. The method of claim 60, further comprising the steps of:
receiving appearance information indicative of the identity of the sender; and
using said appearance information to generate said animation texture.

64. The method of claim 60, further comprising the steps of:
receiving appearance information indicative of the content of the message; and
using said appearance information to generate said animation texture.

65. The method of claim 42, further comprising the step of displaying said textured message as a two-dimensional element on the recipient viewport after rendering said textured message in the three-dimensional multi-user environment.

66. The method of claim 42, further comprising the step of displaying said textured message as a two-dimensional element on the recipient viewport for a predetermined time period after rendering said textured message at said textured message in the three-dimensional multi-user environment.

67. The method of claim 42, further comprising the steps of:
displaying said textured as a two-dimensional element on the bottom of said recipient viewport after rendering said textured message in the three-dimensional multi-user environment; and
vertically displacing said two-dimensional element to accomodate other textured messages at the bottom of said recipient viewport.

68. The method of claim 65, wherein said two-dimensional element is displayed in horizontal alignment with the appearance of the digital representation of the sender in the recipient viewport.

69. The method of claim 65, wherein said two-dimensional element is displayed flush right on the recipient viewport when the digital representation of the sender is to the right of the scope of the recipient viewport and flush left on the recipient viewport when the digital representation of the sender is to the left of the scope of the recipient viewport.

70. A method for delivering a message from at sender to a recipient in a three-dimensional multi-user environment wherein the recipient has a viewport into the three-dimensional multi-user environment and the sender and the recipient are each digitally represented therein, comprising the steps of receiving the message;
mapping the message to a texture to generate a textured message;
selecting a first location in the three-dimensional multi-user environment closer to the digital representation of the sender than to the digital representation of the recipient;
selecting a second location in the three-dimensional multi-user environment closer to the digital representation of the recipient than to the digital representation of the sender; and
periodically rendering said textured message in the three-dimensional multi-user environment along a path beginning at the first location and ending at the second location, so as to permit the recipient to visually ascertain the location of the digital representation of the sender through the recipient viewport.

71. The method of claim 70, further comprising the step of displaying said textured message as a two-dimensional element on the recipient viewport after rendering said textured message at said second location in the three-dimensional multi-user environment.

72. The method of claim 70, further comprising the steps of:
receiving path information; and
using said path information to define the shape of said path between said first location and said second location.

73. The method of claim 70, further compromising the steps of:
receiving path information from the sender; and
using said path information to define the shape of said path between said first location and said second location.

74. The method of claim 70, further comprising the steps of:
receiving path information indicative of the identity of the sender; and
using said path information to define the shape of said path between said first location and said second location.

75. A method for delivering a message from a sender to a recipient in a three-dimensional multi-user environment wherein the recipient has a viewport into the three-dimensional multi-user environment and the sender and the recipient are each digitally represented therein, comprising the steps of:
receiving the message;
mapping the message to a texture to generate a textured message;
periodically determining the location of the digital representation of the sender and the location of the digital representation of the recipient;
periodically rendering said textured message in the three-dimensional multi-user environment along a path between said location of the digital representation of the sender and said location of the digital representation of the recipient, so as to permit the recipient to visually ascertain said location of the digital representation of the sender through the recipient viewport.

76. The method of claim 75, further comprising the step of displaying said textured message as a two-dimensional element on the recipient viewport after periodically rendering said textured message along a path between said location of the digital representation of the sender and said location of the digital representation of the recipient.

77. The method of claim 75, wherein said step of periodically rendering said textured message in the three-dimensional multi-user environment along a path between said location of the digital representation of the sender and said location of the recipient further comprises the steps of:
selecting a starting point based on the location of the digital representation of the sender;
selecting an ending point based on the location of the digital representation of the recipient;

selecting a preliminary rendering point on a vector that extends from said starting point to said ending point;

calculating an offset according to an offset function based at least in part on the position of said preliminary rendering point along said vector;

determine a final rendering point by adding said offset to said preliminary rendering point; and rendering said textured message at said final rendering point;

wherein said offset function is equal to zero at said starting point and said ending point, thereby ensuring smooth rendering of said textured message.

78. The method of claim 77, wherein said offset function is a sinusoidal function.

79. The method of claim 77, further comprising the step of:

receiving path information, wherein said path information includes said offset function.

80. The method of claim 77, further comprising the step of:

receiving path information from the sender, wherein said path information includes said offset function.

81. The method of claim 77, further comprising the step of:

receiving path information from the sender, wherein said path information includes said offset function and is indicative of the identity of the sender.

82. A method for delivering a message from a sender to a recipient in a three-dimensional multi-user environment wherein the recipient has a viewport into the three-dimensional multi-user environment and the sender and the recipient are each digitally represented therein, comprising the steps of:

periodically checking a transition state;

if said transition state is "just arrived", mapping the message to a texture to generate a textured message and changing said transition state to "3D transition";

if said transition state is "3D transition", rendering said textured message at locations along a path in the three-dimensional multi-user environment and changing said transition state to "2D transition";

if said transition state is "2D transition", displaying a 2D transition animation and changing said transition state to "in list", and if said transition state is "in list", displaying said textured message as a two-dimensional element on the recipient viewport.

83. A method for delivering a message from a sender to a recipient in a three-dimensional multi-user environment wherein the sender and recipient are each digitally represented therein, comprising the steps of:

mapping the message to a texture to generate a textured message;

rendering said textured message in the three-dimensional multi-user environment so as to permit the recipient to visually ascertain the location of the digital representation of the sender.

84. The method of claim 83, wherein the rendering step includes rendering said textured message in the three-dimensional multi-user environment closer to the digital representation of the sender than to the digital representation of the recipient, and subsequently rendering said textured message in the three-dimensional multi-user environment closer to the digital representation of the recipient than to the digital representation of the sender.

85. The method of claim 84, wherein said message is sent to the recipient over the Internet.

86. A computer program product comprising a computer useable medium having computer program logic for enabling at least one processor in a computer system to provide a recipient interface to a three-dimensional multi-user environment that includes a recipient viewport and to receive a message from a sender, wherein said three-dimensional multi-user environment maintains a digital representation of the sender, said computer program logic comprising:

means for enabling at least one processor to receive a message;

means for enabling at least one processor to map said message to a texture to generate a textured message;

means for enabling at least one processor to render said textured message in the three-dimensional multi-user environment so as to indicate the location of the digital representation of the sender on the recipient viewport.

87. The computer program product of claim 86, further comprising means for enabling at least one processor to display said textured message as a two-dimensional element on the recipient viewport after rendering said textured message in the three-dimensional multi-user environment.

* * * * *

US006784901C1

(12) INTER PARTES REEXAMINATION CERTIFICATE (0034th)
United States Patent
Harvey et al.

(10) Number: US 6,784,901 C1
(45) Certificate Issued: Oct. 7, 2008

(54) METHOD, SYSTEM AND COMPUTER PROGRAM PRODUCT FOR THE DELIVERY OF A CHAT MESSAGE IN A 3D MULTI-USER ENVIRONMENT

(75) Inventors: William D. Harvey, Palo Alto, CA (US); Jason G. McHugh, East Palo Alto, CA (US); Fernando J. Paiz, Millbrae, CA (US); Jeffrey J. Ventrella, San Francisco, CA (US)

(73) Assignee: There, Menlo Park, CA (US)

Reexamination Request:
No. 95/000,155, Sep. 19, 2006

Reexamination Certificate for:
Patent No.: 6,784,901
Issued: Aug. 31, 2004
Appl. No.: 09/653,352
Filed: Aug. 31, 2000

Related U.S. Application Data

(60) Provisional application No. 60/202,920, filed on May 9, 2000.

(51) Int. Cl.
*G09G 5/00* (2006.01)
*H04L 29/08* (2006.01)
*H04L 12/18* (2006.01)
H04L 29/06; H04L 12/58

(52) U.S. Cl. .................. 715/757; 709/204; 709/227; 715/758; 715/848

(58) Field of Classification Search .................. 715/757, 715/758
See application file for complete search history.

(56) References Cited

U.S. PATENT DOCUMENTS 5,880,731 A 3/1999 Liles
5,956,038 A 9/1999 Rekimoto

OTHER PUBLICATIONS

Forterra Systems, Inc.'s Opening Claim Construction Brief in *Forterra Systems, Inc. v. Avatar Factory et al.* Case No. C05–04472 (N.D. Cal).
Forterra Systems, Inc.'s Reply Claim Construction Brief in *Forterra Systems, Inc. v. Avatar Factory et al.* Case No. C05–04472 (N.D. Cal).
Declaration of Richard F. Ferraro In Support of Forterra's Opening Claim Construction Brief in *Forterra Systems, Inc. v. Avatar Factory et al.* Case No. C05–04472 (N.D. Cal).
Plaintiff Forterra's Disclosure of Asserted Claims and Preliminary Infringement Contentions in *Forterra Systems, Inc. v. Avatar Factory et al.* Case No. C05–04472 (N.D. Cal).
Joint Claim Construction and Prehearing Statement in *Forterra Systems, Inc. v. Avatar Factory et al.* Case No. C05–04472 (N.D. Cal).
Damer, Bruce, Avatars! Exploring and Building Virtual Worlds on the Internet, Peachpit Press, 1998 (including CD accompanying book).
Printouts of Damer, Bruce, Avatars! Exploring & Building Virtual Worlds on the Internet, Peachpit Press, 1998, (including CD accompanying book).
Isaacs, Ellen, "Microcosm: Sup for virtual comm. via an on–line graphical environment," Proc. of the Conf. on Computer–Human Interaction (CHI) '98, L.A. , CA ACM Press, 5–6.

(Continued)

*Primary Examiner*—Roland G. Foster

(57) ABSTRACT

A chat system, method and computer program product for delivering a message between a sender and a recipient in a three-dimensional (3D) multi-user environment, wherein the 3D multi-user environment maintains respective digital representations of the sender and the recipient, uses a recipient interface to receive a message, map the message to a texture to generate a textured message, and render the textured message in the 3D multi-user environment so as to permit the recipient to visually ascertain the location of the digital representation of the sender in the 3D world. Received messages are maintained as two-dimensional elements on a recipient viewport.

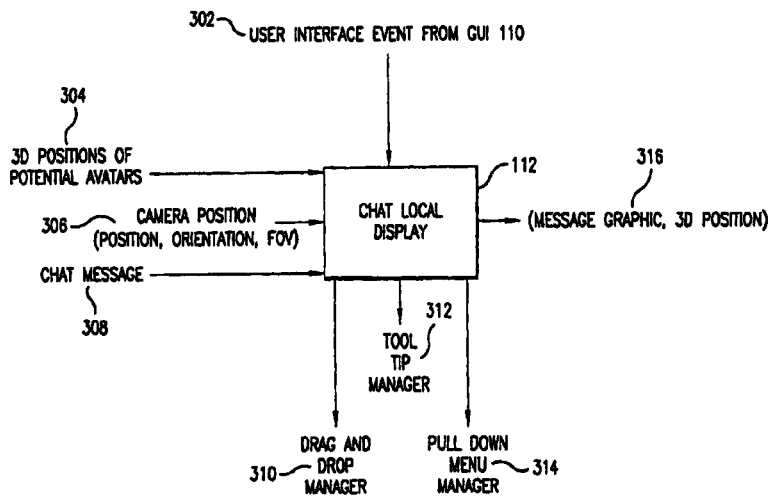

OTHER PUBLICATIONS

Brewer, Stephen and Mary Jo Foley, A New World of Animated Discussion: 3D Chat—See why online chats' new visual trappings are the talk of the town, HomePC, Mar. 1, 1997.

"The Official Avatar Handbook: A Comprehensive Guide to Understanding Habitat" (Copyright 1987 Lucasfilm Ltd.).

Benedikt, Michael, "Cyberspace: First Steps", the MIT Press, 1992. pp. 1–436 (Cyberspace: First Steps).

David Kurlander et al., Comic Chat, Int'l Conference on Computer Graphics & Interactive Tech.; Proc. of the 23rd Ann. Conf. on Computer Graphics & Interactive Techniques, 199.

Help Text file (describing Active Worlds) from CD accompanying Damer, Bruce, Avatars! Exploring and Building Virtual Worlds on the Internet, Peachpit Press, 1998.

Declaration of F. Randall Farmer (including accompanying Exhibit 1 (EC Habitats Beta Program)).

Declaration of Bruce Damer (including accompanying Exhibit 1 (EC habitats demonstration) and Exhibit 2 (1997 demonstration of Active Worlds Program)).

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–16, 24, 27, 39, 42–50, 52–55, 65, 67, 68, 83, 86 and 87 are cancelled.

Claims 17–23, 25, 26, 28–38, 40, 41, 51, 56–64, 66, 69–82, 84 and 85 were not reexamined.

\* \* \* \* \*